United States Patent
Shiraki

(10) Patent No.: US 9,426,066 B2
(45) Date of Patent: Aug. 23, 2016

(54) ETHERNET SWITCH AND COMMUNICATION METHOD

(71) Applicant: FUJITSU LIMITED, Kawasaki-shi, Kanagawa (JP)

(72) Inventor: Osamu Shiraki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 331 days.

(21) Appl. No.: 14/011,818

(22) Filed: Aug. 28, 2013

(65) Prior Publication Data

US 2014/0064284 A1 Mar. 6, 2014

(30) Foreign Application Priority Data

Sep. 5, 2012 (JP) ................................. 2012-195108

(51) Int. Cl.
 H04L 12/28 (2006.01)
 H04L 12/741 (2013.01)
 H04L 12/931 (2013.01)
(52) U.S. Cl.
 CPC ............. H04L 45/74 (2013.01); H04L 49/357 (2013.01)
(58) Field of Classification Search
 None
 See application file for complete search history.

(56) References Cited

U.S. PATENT DOCUMENTS

| | | | |
|---|---|---|---|
| 2004/0213272 A1 | 10/2004 | Nishi et al. | |
| 2008/0175265 A1* | 7/2008 | Yonge | H04B 3/54 370/447 |
| 2009/0037977 A1* | 2/2009 | Gai | H04L 41/00 726/1 |
| 2009/0276526 A1* | 11/2009 | Carlson | H04L 63/101 709/225 |
| 2011/0078334 A1 | 3/2011 | Arakawa et al. | |
| 2011/0135303 A1 | 6/2011 | Hufferd | |
| 2012/0106957 A1* | 5/2012 | Willeke | H04L 29/12207 398/58 |
| 2012/0177041 A1 | 7/2012 | Berman | |

FOREIGN PATENT DOCUMENTS

| | | |
|---|---|---|
| JP | 2004-304371 A | 10/2004 |
| JP | 2008-258917 | 10/2008 |
| JP | 2011-076582 | 4/2011 |

OTHER PUBLICATIONS

Japanese Office Action mailed on Jan. 26, 2016 for corresponding Japanese Patent Application No. 2012-195108, with Partial English Translation, 5 pages.

* cited by examiner

*Primary Examiner* — Kevin C Harper
(74) *Attorney, Agent, or Firm* — Fujitsu Patent Center

(57) ABSTRACT

An Ethernet switch which is connected to a plurality of external devices using an encapsulating I/O protocol over Ethernet, and is connected to a I/O protocol switch using N_Port ID virtualization includes: a storage unit which stores destination information describing an external device whose connection is established in the FCoE in the plurality of external devices; and a processor. When the processor receives a packet addressed from a first external device to a second external device in the external devices, the processor checks whether or not the destination information describes the second external device. When the second external device is described in the destination information, the processor transmits the packet to the second external device.

10 Claims, 23 Drawing Sheets

| RECEPTION PORT | TRANSMISSION PORT | PRE-TRANSFORM PACKET HEADER INFORMATION (INCLUDING SOURCE MAC ADDRESS, FC EXCHANGE ID) | POST-TRANSFORM PACKET HEADER INFORMATION (INCLUDING FC EXCHANGE ID) |
|---|---|---|---|
| ... | ... | ... | ... |
| ... | ... | ... | ... |

F I G. 5

| FC_ID | MAC ADDRESS | PORT NUMBER | 232 |
|---|---|---|---|
| ... | ... | ... | |
| ... | ... | ... | |

FIG. 6

| FC_ID (1) | FC_ID (2) | 233 |
|---|---|---|
| ... | ... | |
| ... | ... | |

F I G. 7

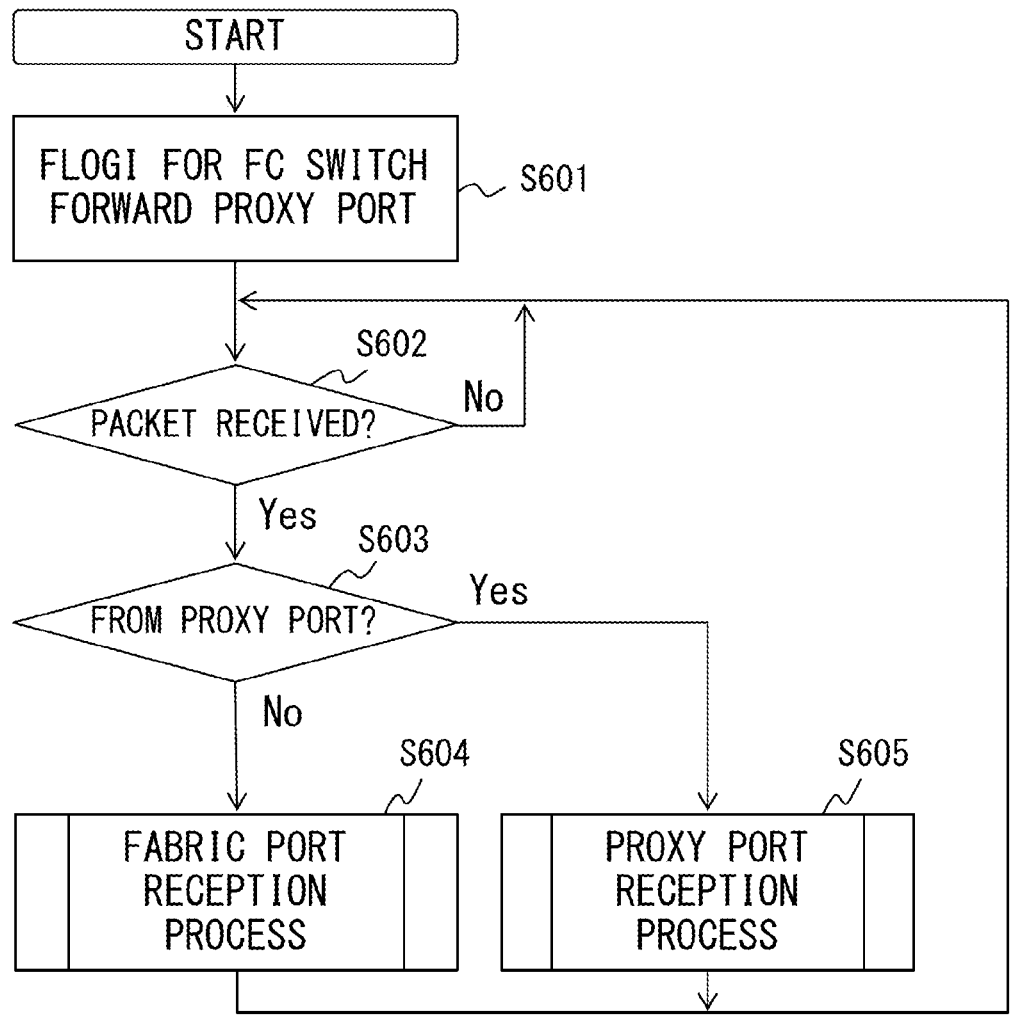
F I G. 8

FIG. 17

| RECEPTION PORT | TRANSMISSION PORT | PRE-TRANSFORM PACKET HEADER INFORMATION (INCLUDING FC EXCHANGE ID) | POST-TRANSFORM PACKET HEADER INFORMATION (INCLUDING FC EXCHANGE ID) |
|---|---|---|---|
| ⋮ | ⋮ | ⋮ | ⋮ |
| ⋮ | ⋮ | ⋮ | ⋮ |

1216

ETHERNET SWITCH AND COMMUNICATION METHOD

CROSS-REFERENCE TO RELATED APPLICATIONS

This application is based upon and claims the benefit of priority of the prior Japanese Patent Application No. 2012-195108, filed on Sep. 5, 2012, the entire contents of which are incorporated herein by reference.

FIELD

The embodiments discussed herein are related to an Ethernet switch and communication method.

BACKGROUND

Since a storage communication requires higher communication performance than an inter-server communication, a different network has conventionally been provided for each of the communications. The inter-server communication network is called a local area network (LAN), and the storage communication network is called a storage area network (SAN).

However, with the recent progress of high-speed Ethernet, an integrated network has been realized by integrating the inter-server communication with the storage communication. A Fibre Channel over Ethernet (FCoE) is the technology with the Ethernet for processing a packet of a Fibre Channel (FC).

A conventional FC device may be accessed from a system using the FCoE through an appropriate gateway device. It is a method for configuring a new integrated network system while utilizing existing resources.

FIG. 1A illustrates a configuration of a conventional system.

A system 11 includes an Ethernet switch 12, an FC switch 13, a server 14-i (i=1~4), and storage 15-i.

The Ethernet switch 12 performs processes such as routing and transforming a packet, etc.

The Ethernet switch 12 has a gateway using N_port ID virtualization (NPIV), and is connected to the FC switch 13 using the NPIV.

The NPIV refers to the technology of virtualizing the ID of an N_Port and allows a physical port (N_Port) to have a plurality of port names and fabric addresses (N_Port ID).

A plurality of devices (servers 14-1 and 14-2, storage 15-1 and 15-2) are connected to the Ethernet switch 12, and the Ethernet switch 12 presents the FC switch 13 with a plurality of devices as if they were one device using the NPIV.

The Ethernet switch 12 is connected to the FC switch 13, servers 14-1 and 14-2, and the storage 15-1 and 15-2 through a network such as a LAN etc.

The port to which the FC switch 13 of the Ethernet switch 12 has the function of transform the FCoE and the FC. The function assigns a unique MAC address to the FC switch 13, removes the capsule of the FCoE from the FCoE packet transmitted outside from the port, and transmits an FC packet. The function capsules the FC packet received from the port into an FCoE packet.

The FC switch 13 is connected to the Ethernet switch 12, the servers 14-3 and 14-4, and the storage 15-3 and 15-4.

An FC-SAN is configured by the FC switch 13, the servers 14-3 and 14-4, and the storage 15-3 and 15-4.

In the system 11 in FIG. 1A, the FCoE network is connected to the SAN.

There also is a system in which SANs are connected.

FIG. 1B illustrates a configuration of another conventional system.

A system 21 includes an FC switch 22, an FC switch 23, a server 24-i (i=1~4), and storage 25-i.

The FC switch 22 performs processes of routing and transforming a packet, etc.

The FC switch 22 has a gateway using an NPIV, and is connected to the FC switch 23 using the NPIV.

A plurality of units (servers 24-1 and 24-2, storage 25-1 and 25-2) are connected to the FC switch 22, and the FC switch 22 presents the FC switch 23 with a plurality of devices as if they were one device using the NPIV.

The FC switch 22 is connected to the FC switch 23, the servers 24-1 and 24-2, and the storage 25-1 and 25-2.

The FC switch 23 is connected to the FC switch 22, the servers 24-3 and 24-4, and the storage 25-3 and 25-4.

An FC-SAN is configured by the FC switch 23, the servers 24-3 and 24-4, and the storage 25-3 and 25-4.

The route of a packet when the packet is transmitted between the FCoE devices in the system in FIG. 1A is described below.

FIG. 2 illustrates a communication between conventional FCoE devices.

FIG. 2 illustrates a communication between the server 14-1 and the storage 15-2.

When a packet is transmitted from the server 14-1 to the storage 15-2, the packet is transmitted from the server 14-1 to the Ethernet switch 12, transferred from the Ethernet switch 12 to the FC switch 13, transmitted from the FC switch 13 to the Ethernet switch 12, and transmitted from the Ethernet switch 12 to the storage 15-2.

Thus, in the communication between the devices under the NPIV connected to the Ethernet switch 12, a packet is transmitted through the FC switch 13.

In the conventional system, although a communication is performed between the devices under the NPIV, the packet is transmitted through an external switch. Therefore, the path is long and the communication latency becomes large. Furthermore, there is a communication bottleneck between switches.

[Patent Document 1] Japanese Laid-open Patent Publication No. 2011-76582

[Patent Document 2] Japanese Laid-open Patent Publication No. 2008-258917

SUMMARY

According to an aspect of the invention, an Ethernet switch is connected to a plurality of external devices using an encapsulating I/O protocol over Ethernet, and is connected to an I/O protocol switch using an N_Port ID virtualization.

The Ethernet switch includes a storage unit and a processor.

The storage unit stores destination information describing an external device whose connection is established in the encapsulating I/O protocol over Ethernet in the plurality of external devices.

When the processor receives a packet address from a first embodiment to a second embodiment in the plurality of external devices, the processor checks whether or not the second embodiment is described in the destination information, and transmits the packet to the second embodiment if the second embodiment is described in the destination information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

FIG. 5 is an example of a FLOGI process DB;

FIG. 6 is an example of an FCoE destination DB;

FIG. 7 is an example of an FCoE security DB;

FIG. 8 is a flowchart of packet processing of an Ethernet switch according to the first embodiment;

FIG. 17 is an example of the FLOGI process DB;

DESCRIPTION OF EMBODIMENTS

The embodiments of the present invention are described below with reference to the attached drawings.

First Embodiment

Figure 1A:
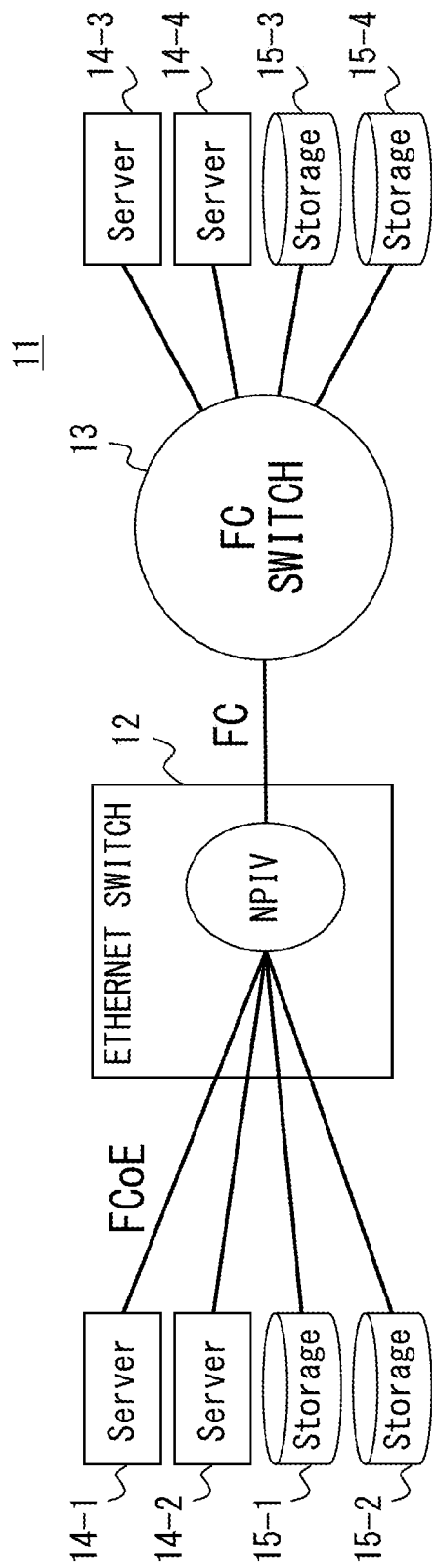
FIG. 1A illustrates a configuration of a conventional system.
Figure 1B:
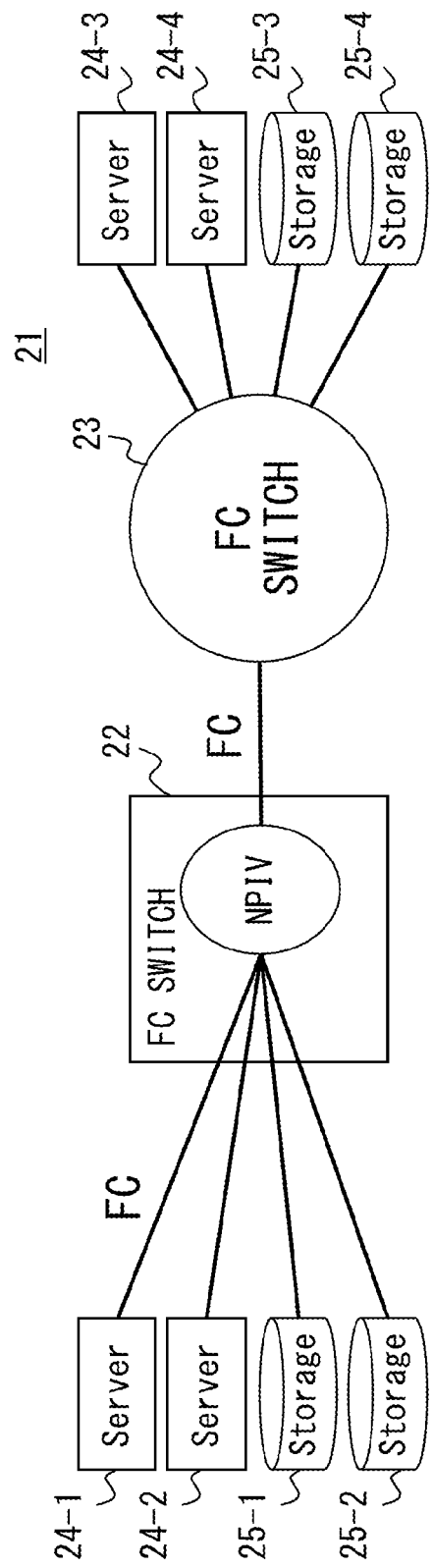
FIG. 1B illustrates a configuration of another conventional system.
Figure 2:
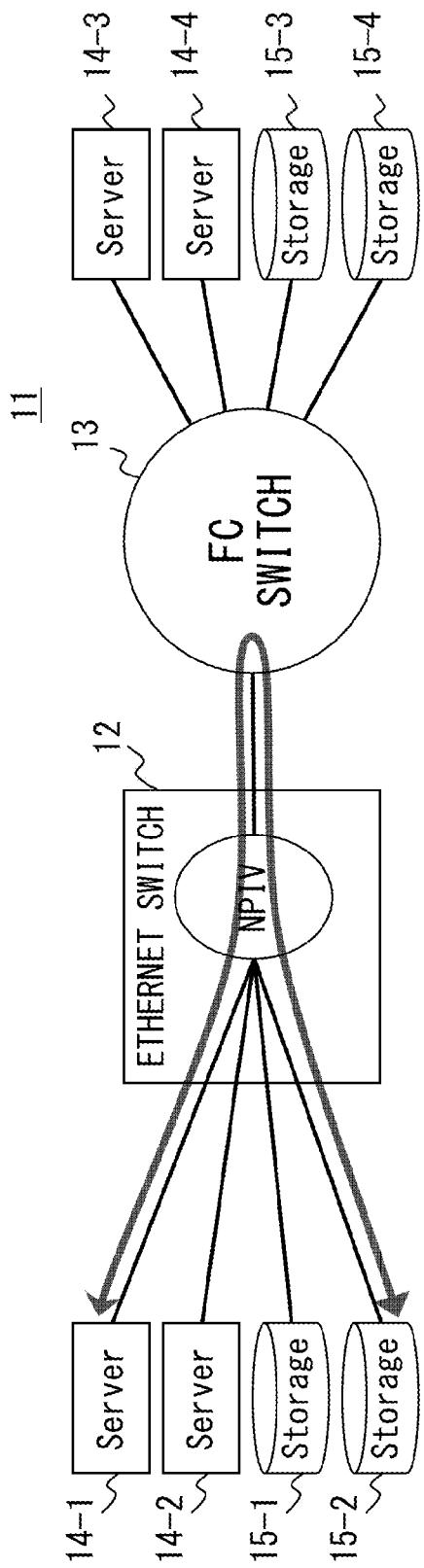
FIG. 2 illustrates a communication between conventional FCoE devices.
Figure 3:
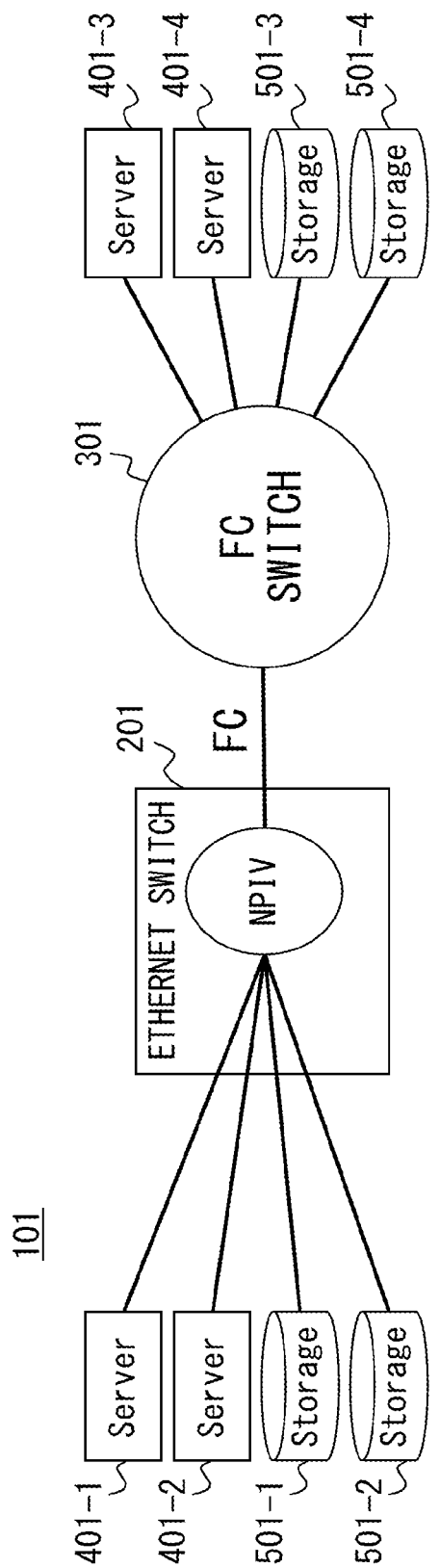
FIG. 3 illustrates a configuration of the system according to the first embodiment.

FIG. 3 illustrates a configuration of the system according to the first embodiment.

A system 101 includes an Ethernet switch 201, an FC switch 301, a server 401-$i$ ($i$=1~4), and storage 501-$i$.

The Ethernet switch 201 performs processes of routing and transforming a packet etc.

The Ethernet switch 201 has a gateway using N_Port ID virtualization (NPIV), and is connected to the FC switch 301 using the NPIV.

The NPIV refers to the technology of virtualizing the ID of an N_Port to allow one physical port (N_Port) to have a plurality of port names and fabric addresses (N_Port ID).

The Ethernet switch 201 presents the FC switch 301 with a plurality of devices using the NPIV as if they were one device.

The Ethernet switch 201 is connected to the FC switch 301, servers 401-1 and 401-2, and storage 501-1 and 501-2.

The port to which the FC switch 301 of the Ethernet switch 201 has the function of mutually transforming the FCoE and the FC. The function assigns a unique MAC address to the FC switch 301, removes a capsule of the FCoE from the FCoE packet transmitted outside the port, and transmits an FC packet. The function capsulate the FC packet received from the port to an FCoE packet. In this case, a MAC address assigned as a transmission MAC address to the FC switch 301 is used.

The Ethernet switch 201 is connected to the servers 401-1 and 401-2 and the storage 501-1 and 501-2 through a network such as a LAN etc.

The FC switch 301 is connected to the Ethernet switch 201, the servers 401-3 and 401-4, and the storage 501-3 and 501-4.

The FC switch 301 is connected to the Ethernet switch 201, the servers 401-3 and 401-4, and the storage 501-3 and 501-4 through an optical fiber cable, and communicates with the Ethernet switch 201, the servers 401-3 and 401-4, and the storage 501-3 and 501-4 using the FC.

The FC-SAN is configured by the FC switch 301, the servers 401-3 and 401-4, and the storage 501-3 and 501-4.

The server 401 is an information processing device which performs various types of processing.

The servers 401-1 and 401-2 communicate with the Ethernet switch 201 using the FCoE. The servers 401-1 and 401-2 have a port for use in connection to the Ethernet switch 201, and each port has a unique MAC address. In addition, a unique Fibre Channel ID is assigned to each port.

The servers 401-3 and 401-4 has an FC interface, and communicate with the FC switch 301 using the FC.

The storage 501 is a device which stores data. The storage 501 is, for example, a disk array device having a plurality of hard disk drives.

The storage 501-1 and 501-2 communicate with the Ethernet switch 201 using the FCoE. The storage 501-1 and 501-2 has a port for use in connection with the Ethernet switch 201, and each port has a unique MAC address. A unique Fibre Channel ID is assigned to each port.

The storage 501-3 and 501-4 has an FC interface, and communicate with the FC switch 301 using the FC.

The servers 401-1 and 401-2 and the storage 501-1 and 501-2 have the function of mutually transforming the FCoE and the FC, transform an FC packet into an FCoE packet, and transmits the transformed packet to the Ethernet switch 201. The servers 401-1 and 401-2 and the servers 401-1 and 401-2 are examples of an FCoE device.

Figure 4:
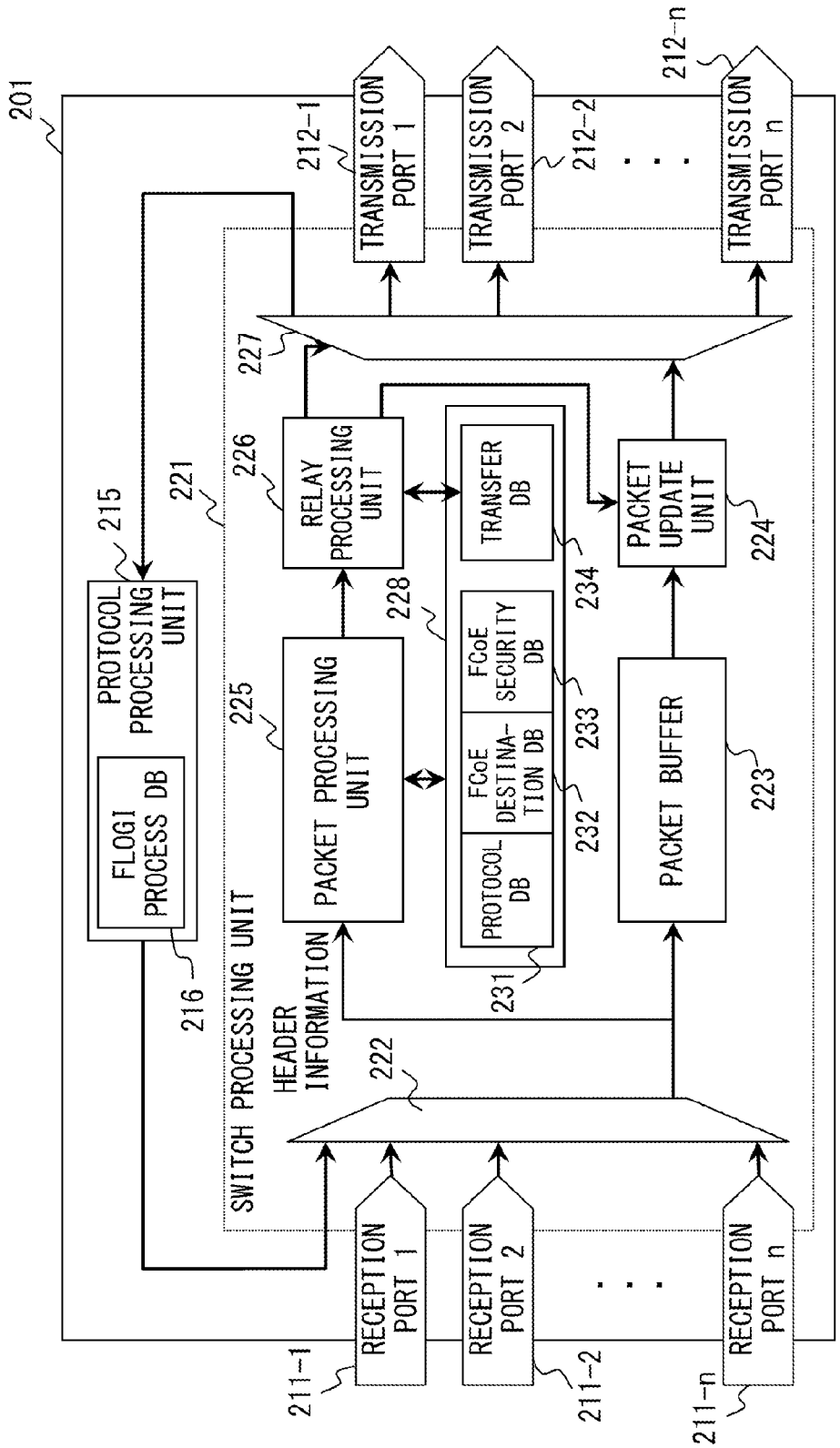
FIG. 4 illustrates a configuration of the Ethernet switch according to the first embodiment.

FIG. 4 illustrates a configuration of the Ethernet switch according to the first embodiment.

The Ethernet switch 201 includes a reception port 211-$j$ ($j$=1~n (n is an integer)), a transmission port 212-$j$, a protocol processing unit 215, and a switch processing unit 221.

The reception port 211 is connected to the FC switch 301, the servers 401-1 and 401-2, or the storage 501-1 and 501-2, and is a port which receives a packet.

The transmission port 212 is connected to the FC switch 301, the servers 401-1 and 401-2, or the storage 501-1 and 501-2, and is a port which transmits a packet.

The reception port 211-*j* and the transmission port 212-*j* configure a set of ports, and the same port number is assigned to the reception port 211-*j* and the transmission port 212-*j*.

In the present embodiment, the reception port 211 and the transmission port 212 which is connected to the FC switch 301 is called a Proxy port.

the reception port 211 and the transmission port 212 which is connected to the servers 401-1 and 401-2 or the storage 501-1 and 501-2 is called a Fabric port.

The protocol processing unit 215 perform the processes of establishing a connection, monitoring a protocol, issuing an instruction to the switch processing unit 221, etc.

The protocol processing unit 215 has a FLOGI process database (DB) 216.

The protocol processing unit 215 is realized by, for example, the central processing unit (CPU) (not illustrated in the attached drawings) reading and executing the software stored in the memory (not illustrated in the attached drawings) in the Ethernet switch 201. The protocol processing unit 215 may be realized by, for example, a hardware circuit, a processor, etc.

The FLOGI process DB 216 is a record of processing of the FLOGI which is one of the protocols for establishing a connection in the FCoE (FCoE initialization protocol (FIP)) executed by the Ethernet switch 201.

FIG. 5 is an example of the FLOGI process DB.

The FLOGI process DB 216 has items of a reception port, a transmission port, a pre-transform packet header information, and a post-transform packet header information. The reception port, the transmission port, the pre-transform packet header information, and the post-transform packet header information are associated with one another and stored in the FLOGI process DB 216.

The reception port is an identifier indicating the port which has received a packet. The reception port stores, for example, a port number of the reception port 211 which has received a packet.

The transmission port is an identifier indicating a port which has transmitted a packet. The transmission port stores, for example, a port number of the transmission port 212 which has transmitted a packet.

The pre-transform packet header information is the information about the header of a packet before a transform (FLOGI). The pre-transform packet header information includes a source MAC address and an FC exchange ID.

The source MAC address is a MAC address of the port which has transmitted the packet of the FLOGI.

The FC exchange ID is the identification information assigned to each of the related packets. For example, the FLOGI and the FLOGI ACCEPT (ACC) as a corresponding reply have the same FC exchange ID.

The post-transform packet header information is the information about the header of a packet after a transform (FDISC). The post-transform packet header information includes an FC exchange ID.

The switch processing unit 221 includes a multiplexer 222, a packet buffer 223, a packet update unit 224, a packet processing unit 225, a relay processing unit 226, a demultiplexer 227, and a storage unit 228.

The switch processing unit 221 is realized by, for example, a hardware circuit, a processor, etc.

The multiplexer 222 outputs a packet input from the protocol processing unit 215 and the reception port 211 to the packet buffer 223. Header information is extracted by a header information extraction unit (not illustrated in the attached drawings) from a packet output from the multiplexer 222, and input to the packet processing unit 225.

The packet buffer 223 is a buffer which temporarily stores a received packet. The packet buffer 223 outputs the stored packet to the packet update unit 224.

The packet update unit 224 changes the header of the packet based on an instruction from the relay processing unit 226.

The packet processing unit 225 determines the process of the packet based on the header information, a protocol database (DB) 231, an FCoE destination DB 232, and an FCoE security DB 233. The packet processing unit 225 performs a write and a read about the protocol DB 231, the FCoE destination DB 232, and the FCoE security DB 233. The packet processing unit 225 outputs a control signal indicating the destination of a packet and the change a header to the relay processing unit 226.

The relay processing unit 226 outputs a control signal indicating the destination of the packet to the demultiplexer 227 based on the output from the packet processing unit 225 or a transfer DB 234. The relay processing unit 226 also instructs the packet update unit 224 to change the header of the packet based on the control signal from the packet processing unit 225.

The demultiplexer 227 outputs the packet to one of the transmission port 212 and the protocol processing unit 215 according to the control signal from the relay processing unit 226.

The storage unit 228 is a device which stores data. The storage unit 228 is, for example, RAM (random access memory). The storage unit 228 stores the FCoE destination DB 232, the FCoE security DB 233, and the transfer DB 234.

The protocol DB 231 stores the information for identification of the type of packet. The packet processing unit 225 may discriminate the type of packet by comparing the input header information with the protocol DB 231.

The FCoE destination DB 232 is the information about the FCoE device connected to the Ethernet switch 201 and the information about the transmission port 212 connected to the FCoE device.

Figure 6:
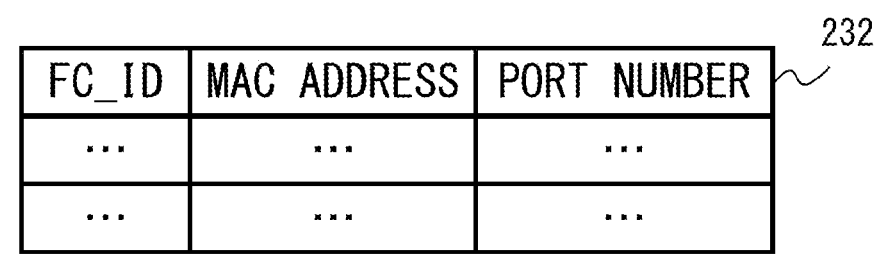

FIG. 6 is an example of the FCoE destination DB.

The FCoE destination DB 232 includes items of an FC ID, a MAC address, and a port number. The FCoE destination DB 232 associates and describes the FC ID, the MAC address, and the port number.

The FC ID is an identifier assigned to each port of the device connected to the Ethernet switch 201.

The MAC address is assigned to the port of an FCoE device.

The port number indicates the transmission port 212.

With reference to the FCoE destination DB, it is judged the port of which device (server or storage) a port of the Ethernet switch 201 is connected to.

The FCoE security DB 233 indicates the set of the ports whose connection has been established.

FIG. 7 is an example of the FCoE security DB.

The FC ID of each port of a set of ports whose connection is established is associated and stored in the FCoE security DB 233.

The transfer DB 234 is the information about the port to which a packet is output. The destination MAC address is associated with a port number and stored in the transfer DB 234.

FIG. 8 is a flowchart of the packet processing of the Ethernet switch according to the first embodiment.

In step S601, the protocol processing unit 215 performs fabric login (FLOGI) to the FC switch 301 through the switch processing unit 221. In the NPIV, the subsequent login processing is performed by issuing a fabric discovery (FDISC) command for the connection established by the FLOGI, thereby establishing a plurality of connections on one link. The FLOGI processing in step S601 is the base of the subsequent login processing.

In step S602, the switch processing unit 221 waits for the reception of a packet, and when it receives the packet, control is passed to step S603.

In step S603, the protocol processing unit 215 and the switch processing unit 221 judge whether or not the received packet has been received in the Proxy port. If the received packet has been received in the Proxy port (that is, if it has been received from the FC switch 301), control is passed to step S605. If the received packet has not been received in the Proxy port (that is, if it has been received from any of the servers 401-1, 401-2 or the storage 501-1, 501-2), then control is passed to step S604. The Ethernet switch 201 has the information indicating that each port of the reception port 211 and the transmission port 212 is the Proxy port or the Fabric port, and the protocol processing unit 215 and the switch processing unit 221 may judge according to the information whether the reception port 211 which has received the packet is the Proxy port or the Fabric port.

In step S604, the Ethernet switch 201 performs the Fabric port reception process. The Fabric port reception process is described later in detail.

In step S605, the Ethernet switch 201 performs the Proxy port reception process. The Proxy port reception process is described later in detail.

Figure 9:
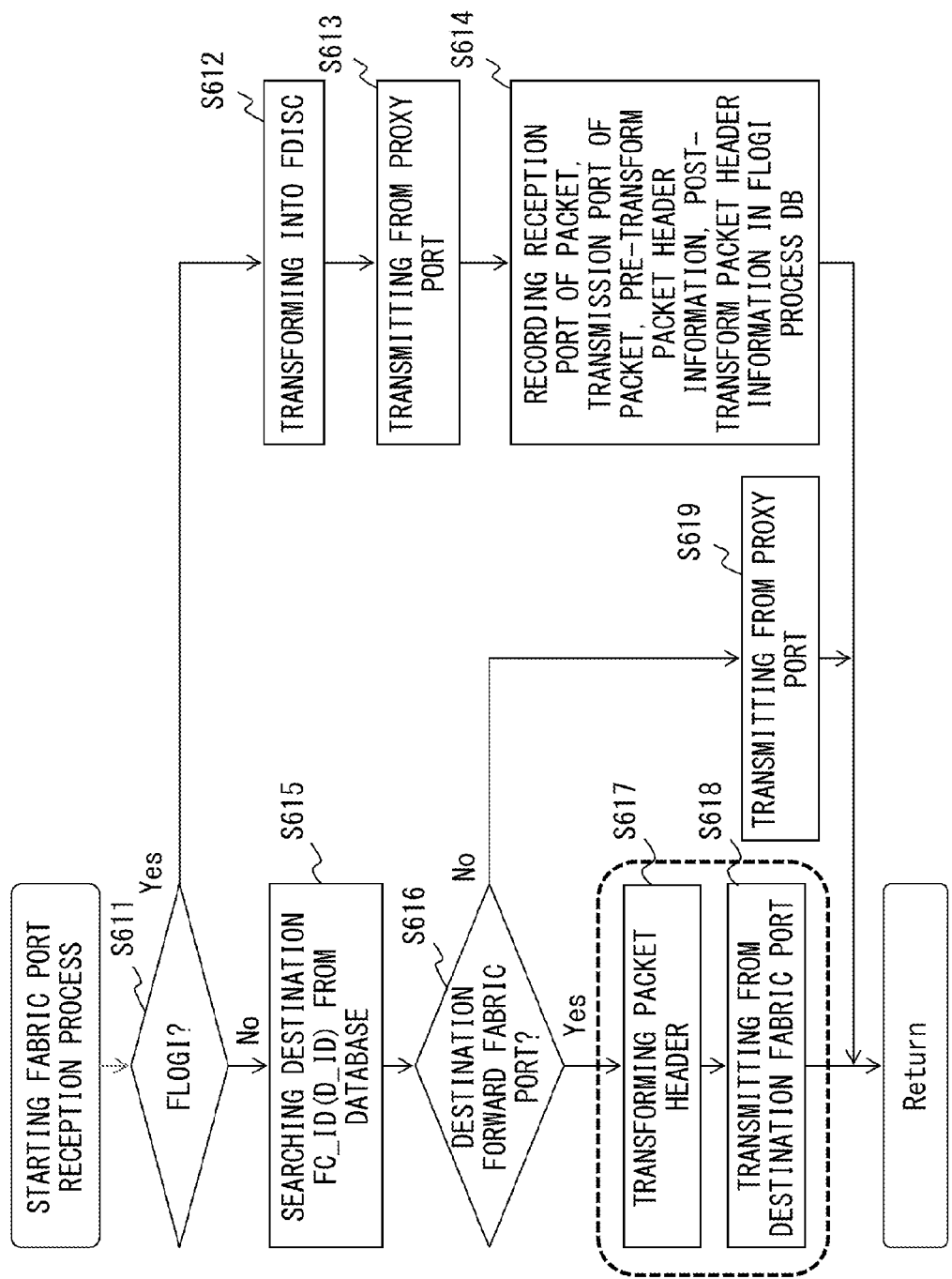
FIG. 9 is a detailed flowchart of a Fabric port reception process according to the first embodiment.

FIG. 9 is a detailed flowchart of the Fabric port reception process according to the first embodiment.

FIG. 9 corresponds to step S604 in FIG. 8.

In step S611, the switch processing unit 221 judges whether or not the received packet is a packet of the FLOGI (FLOGI packet). If the packet is a FLOGI packet, control is passed to step S612. If the packet is not an FLOGI packet, control is passed to step S615.

In step S612, the protocol processing unit 215 transforms an FLOGI packet into a FDISC packet.

In step S613, the protocol processing unit 215 outputs an FDISC packet from the transmission port 212 (Proxy port) connected to the FC switch 301 through the switch processing unit 221.

In step S614, the protocol processing unit 215 records the port number of the reception port 211 which has received the FLOGI packet in the reception port of the FLOGI process DB 216, the port number of the transmission port 212 which has transmitted the FDISC packet in the transmission port of the FLOGI process DB 216, the header information about the FLOGI packet (the source MAC address and the FC exchange ID) in the pre-transform packet header information in the FLOGI process DB 216, and the header information (FC exchange ID) of the FDISC packet in the post-transform packet header information in the FLOGI process DB 216.

As described in the processes in steps S611 through S614, when the Ethernet switch 201 receives a FLOGI packet for establishment of a connection from the FCoE device (servers 401-1, 401-2 or the storage 501-1, 501-2) connected to the Ethernet switch 201, the Ethernet switch 201 transforms the packet into an FDISC packet, and transmits the resultant packet to the FC switch 301. In this case, the Ethernet switch 201 records the information about the FC device which has performed the FLOGI in the FLOGI process DB 216.

In step S615, the packet processing unit 225 searches the FCoE destination DB 232 using the destination ID (D_ID) of the received packet as a search key.

In step S616, the packet processing unit 225 judges whether or not there is a Fabric port connected to the port of the destination ID of the received packet. In detail, when a record having the FC ID identical to the D_ID of the received packet is detected in the retrieval in step S615, the packet processing unit 225 judges that there is a Fabric port connected to the port of the destination ID of the received packet. When there is a Fabric port connected to the port of the destination ID of the received packet, control is passed to step S617. When there is no Fabric port connected to the port of the destination ID of the received packet, control is passed to step S619.

In step S617, the packet processing unit 225 instructs the packet update unit 224 to change the header of the received packet. At the instruction, the packet update unit 224 changes the header of the packet.

Described below are the details of the change of the header of the packet.

Figure 10:
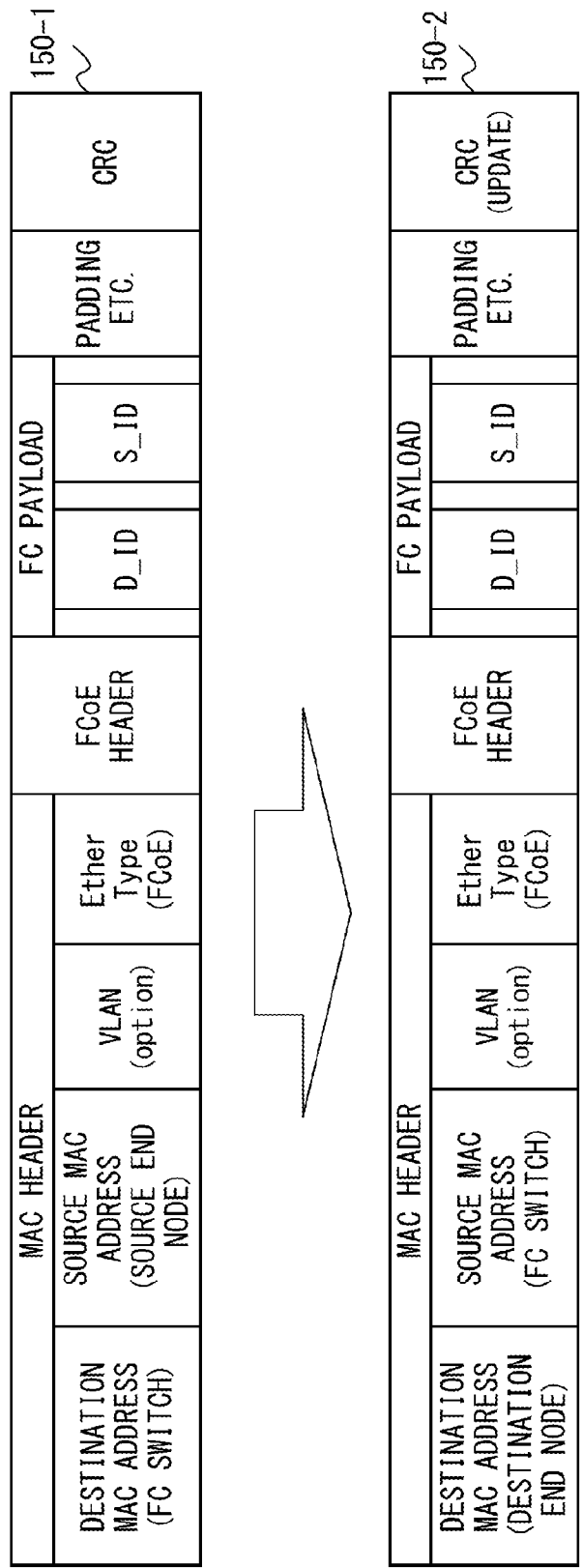
FIG. 10 illustrates a packet before and after the change according to the first embodiment.

FIG. 10 illustrates a packet before and after the change according to the first embodiment.

A packet 150 includes a MAC header, an FCoE header, an FC payload, padding, and CRC.

The MAC header includes a destination MAC address, a source MAC address, VLAN, and ether type.

The destination MAC address is a MAC address of the port of the destination device to which a packet is next transmitted.

The source MAC address is a MAC address of the port of the device which has transmitted the packet immediately before.

The VLAN is an option of the FCoE packet.

The ether type refers to the type of packet.

The FC payload includes an destination ID (D_ID) and a source ID (S_ID).

The destination ID is the FC ID of the destination port of a packet.

The source ID is an FC ID of the port of the source of the packet.

In the first embodiment, the destination MAC address of the packet 150-1 before a change (that is, a packet received by the switch 201) describes the MAC address of the FC switch 301, and the source MAC address describes the MAC address of the source end node (any of servers 401-1, 401-2 and storage 501-1, 501-2).

The packet update unit 224 writes the destination MAC address of the packet 150-1 to the source MAC address of the packet 150-1. The packet update unit 224 also writes the MAC address of the port corresponding to the destination ID of the packet 150-1 to the destination MAC address of the packet 150-1. The packet update unit 224 also changes the CRC depending on the change of the header.

By the process above, the MAC address of the destination end node is described in the destination MAC address of the changed packet 150-2 (that is, the packet output by the switch 201), and the MAC address of the FC switch 301 is described in the source MAC address of the changed packet 150-2.

The description below is given with reference back to FIG. 9.

In step S618, the relay processing unit 226 transmits a packet whose header has been changed from the Fabric port connected to the port of the destination ID. In detail, the relay processing unit 226 transmits a packet whose header has been changed from the transmission port 212 indicated by the port number included in the record detected in step S615.

In step S619, the relay processing unit 226 transmits a packet from the Proxy port in the transmission port 212.

Described below is a concrete example of the header of a packet and the path of a packet when the packet is transmitted between FCoE devices.

Figure 11:
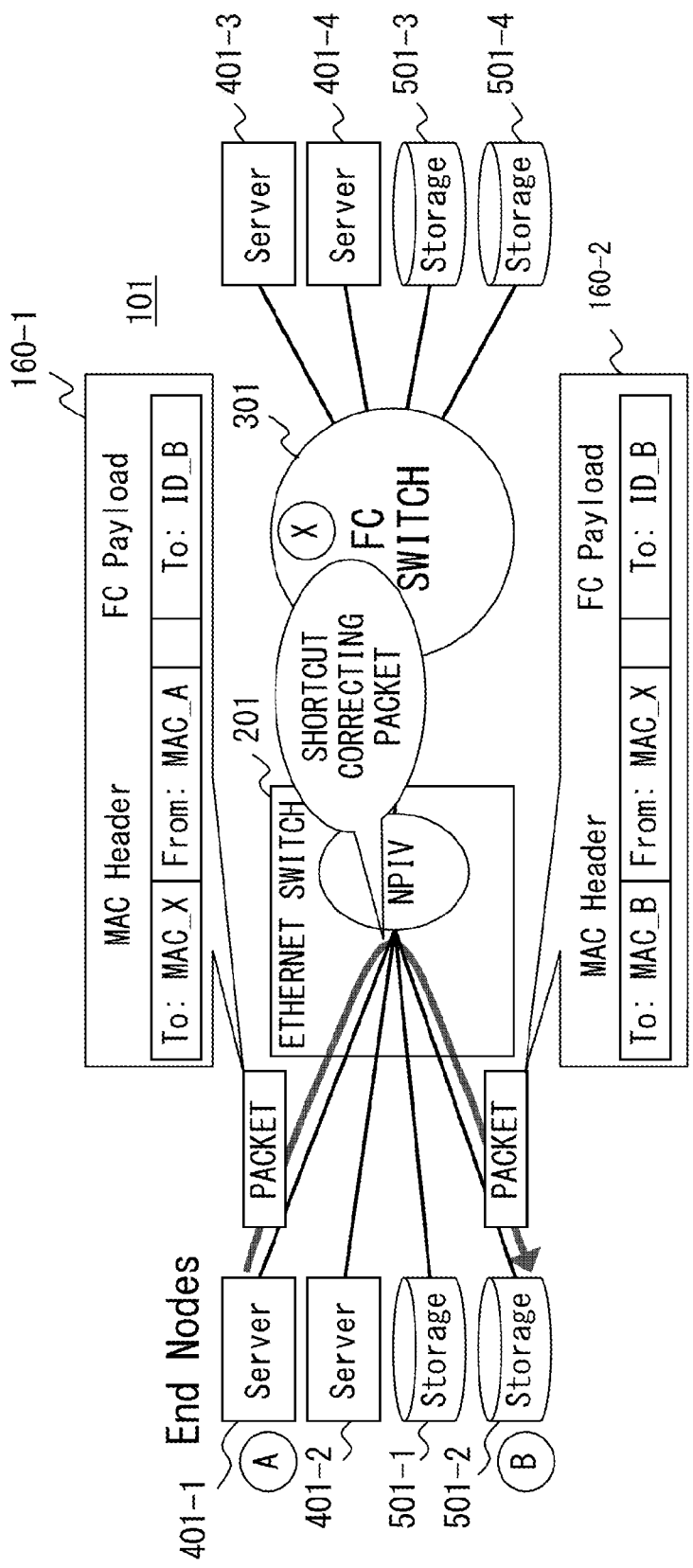
FIG. 11 illustrates the communication between the FCoE devices according to the first embodiment.

FIG. 11 illustrates a communication between FCoE devices.

FIG. 11 illustrates the case in which a packet is transmitted from the server 401-1 to the storage 501-2.

Assume that the MAC address of the server 401-1 is MAC_A. Also assume that the MAC address of the storage 501-2 is MAC_B, the FC ID of the storage 501-2 is ID_B, the MAC address of the FC switch 301 is MAC_X.

The destination MAC address of the packet 160-1 output from the server 401-1 is MAC_X, and the source MAC address is MAC_A. The destination ID of the packet 160-1 is ID_B.

A change of a header described in step S617 is made to the packet 160-1 input to the Ethernet switch 201, and the header-changed packet 160-2 is output to the storage 501-2.

The destination MAC address of the header-changed packet 160-2 is MAC_B, and the source MAC address of the header-changed packet 160-2 is MAC_X. In addition, the destination ID of the packet 160-2 is unchanged as ID_B.

Figure 12:
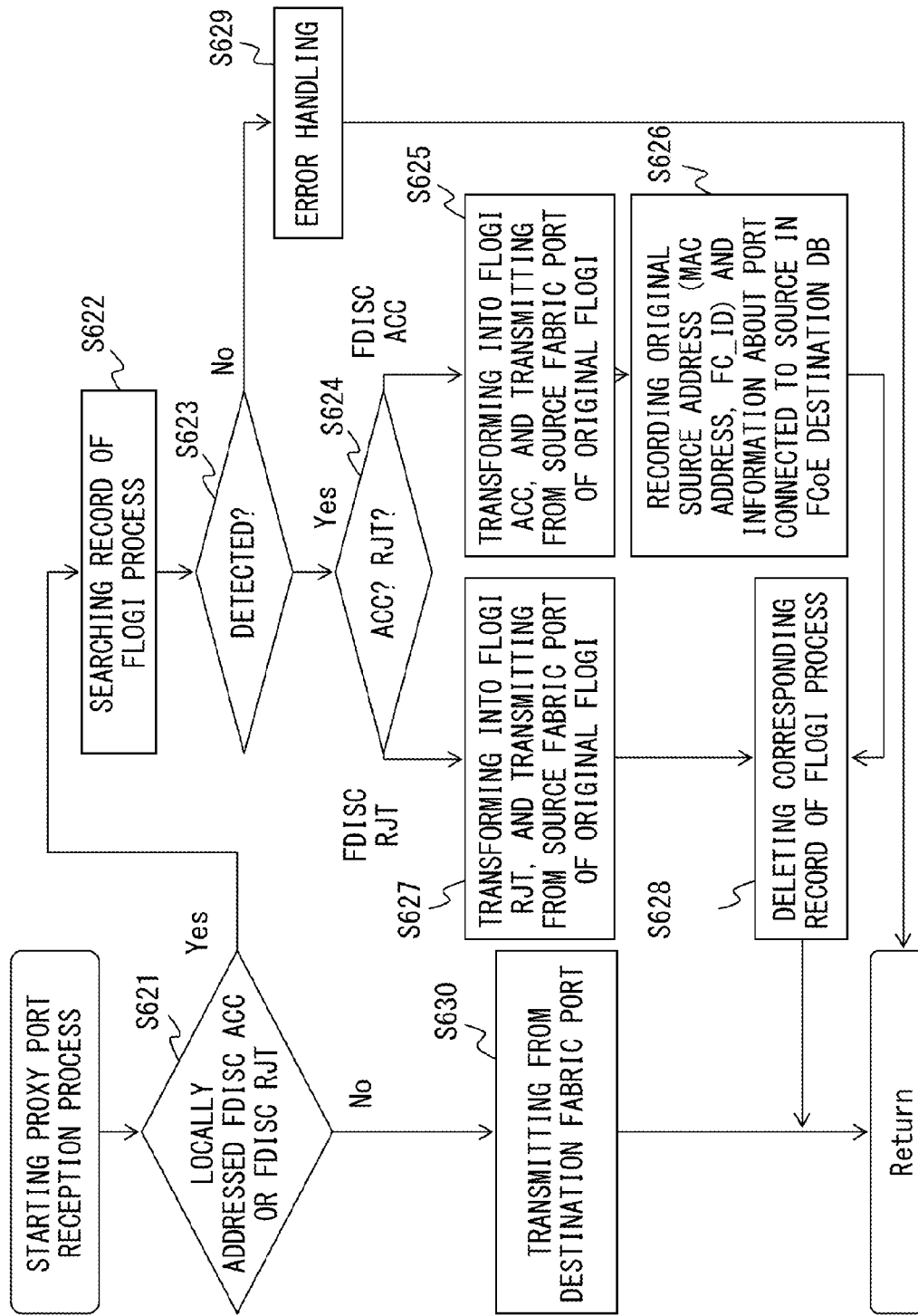
FIG. 12 is a detailed flowchart of the Proxy port reception process according to the first embodiment.

FIG. 12 is a detailed flowchart of the Proxy port reception process according to the first embodiment.

FIG. 12 corresponds to step S605 in FIG. 8.

In step S621, the switch processing unit 221 judges whether the received packet is the FDISC ACC or the FDISC REJECT(RJT) addressed to the Ethernet switch 201. If the received packet is the FDISC ACC or the FDISC RJT addressed to the Ethernet switch 201, control is passed to step S622. If the received packet is not the FDISC ACC or the FDISC RJT addressed to the Ethernet switch 201, control is passed to step S630.

In step S622, the protocol processing unit 215 searches the FLOGI process DB 216 using the FC exchange ID of the packet as a search key. In detail, the protocol processing unit 215 checks whether or not the FC exchange ID of the packet matches the FC exchange ID described in the post-transform packet header information of the FLOGI process DB 216. That is, if the received packet is the FDISC ACC (ACCEPT of FDISC) or the FDISC RJT (REJECT) addressed to the protocol processing unit 215, then the packet is a reply to the packet transmitted after transforming the FLOGI to the FDISC. Therefore, it is checked whether or not there is a record of the FLOGI processing.

In step S623, when the protocol processing unit 215 detects the record of the FLOGI processing (that is, if a record describing the FC exchange ID which is identical to the FC exchange ID of the packet is detected), control is passed to step S624. If it is not detected, control is passed to step S629.

In step S624, the protocol processing unit 215 checks whether the packet is the FDISC ACC or the FDISC RJT. If the packet is the FDISC ACC, control is passed to step S625. If the packet is FDISC, control is passed to step S627.

In step S625, the protocol processing unit 215 transforms the FDISC ACC into FLOGI ACC, and outputs the FLOGI ACC from the Fabric port connected to the source port of the FLOGI. The Fabric port connected to the source port of the FLOGI is the transmission port 212 corresponding to the port number described in the reception port of the record detected from the FLOGI process DB 216 in the search in step S622.

In step S626, the protocol processing unit 215 instructs the packet processing unit 225 to record the source address of the FLOGI (MAC address and the FC ID) and the information (port number) about the port connected to the source. The packet processing unit 225 records the source address (MAC address and FC ID) of the FLOGI and the information about the port (port number) connected to the source in the FCoE destination DB 232.

In step S627, the protocol processing unit 215 transforms the FDISC RJT into the FLOGI RJT, and outputs the FLOGI RJT from the Fabric port connected to the source port of the FLOGI.

In step S628, the protocol processing unit 215 deletes the record (that is, the record detected in step S622) corresponding to the FDISC ACC or the FDISC RJT from the FLOGI process DB 216.

In step S629, the protocol processing unit 215 performs error handling.

In step S630, the switch processing unit 221 outputs a packet from the Fabric port connected to the port of the destination ID.

Described next is the method of enhancing the security in the first embodiment.

The port login (PLOGI) command in the FCoE or FC is to perform a login of a port between a server and storage etc. After the completion of the PLOGI, data may be transferred between ports. The process described below is to monitor the PLOGI, relay the shortcut only between the ports for which the PLOGI has been established, and enhance the security by discarding other packets.

Figure 13:
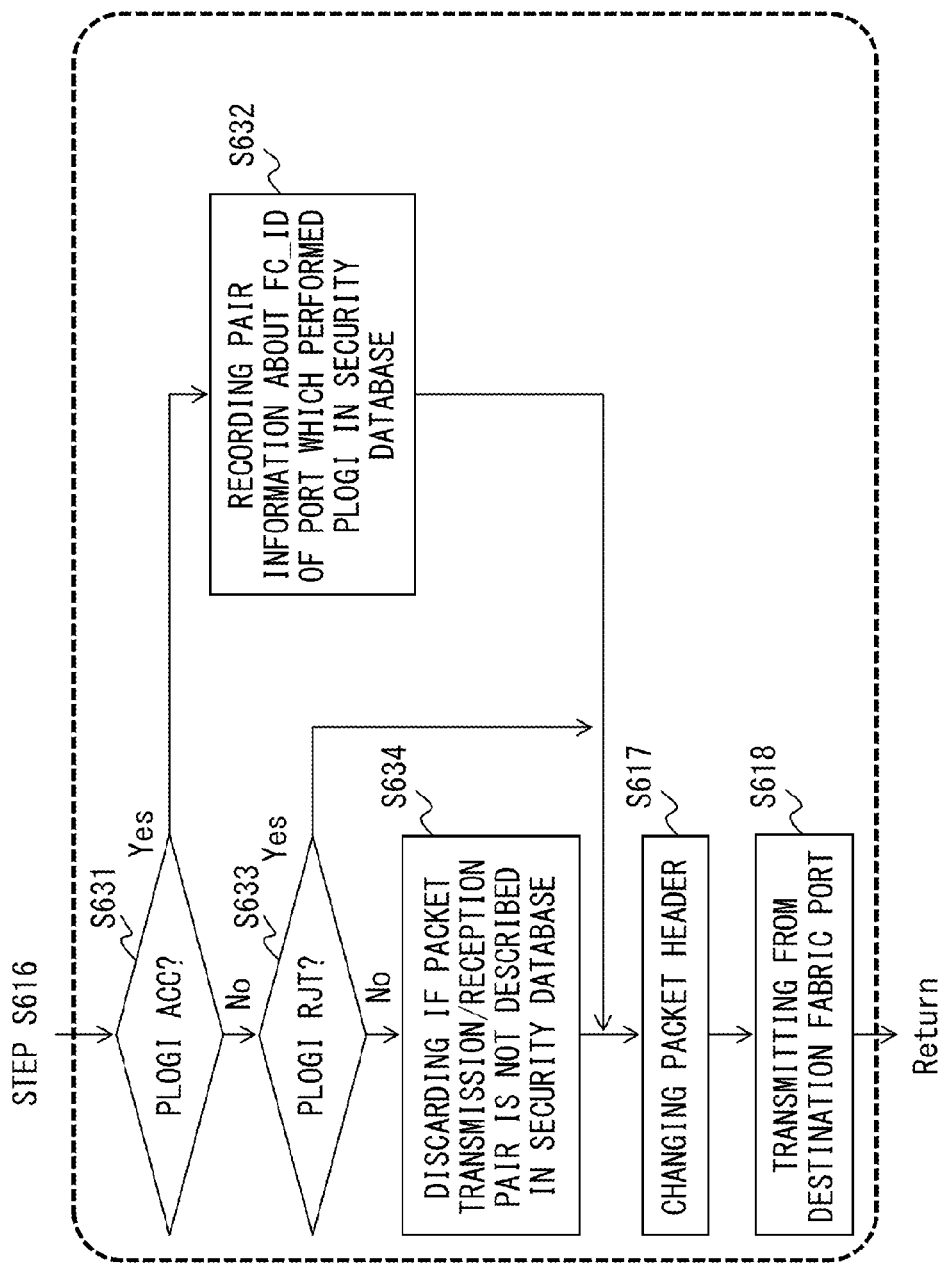
FIG. 13 is a flowchart of the first security check process according to the first embodiment.

FIG. 13 is a flowchart of the first security check process according to the first embodiment.

The first security check process in steps S631 through S634 is performed between steps S616 and S617 of the Fabric port reception process in FIG. 9.

In step S631, the switch processing unit 221 judges whether or not the packet is the PLOGI ACC. If the packet is the PLOGI ACC, control is passed to step S632. If the packet is not the PLOGI ACC, control is passed to step S633.

In step S632, the protocol processing unit 215 instructs the packet processing unit 225 to record the information (that is, the FC IDs of two ports) about the pair of the FC IDs of the ports which have performed the PLOGI. The packet processing unit 225 records the pair information about the FC ID of the ports which have performed the PLOGI. Thus, the FCoE security DB 233 describes the pair information about the ports which have become able to communicate (whose connection has been established) with each other.

In step S633, the packet processing unit 225 judges whether or not the packet is the PLOGI RJT. If the packet is the PLOGI RJT, control is passed to step S617. If the packet is not the PLOGI RJT, control is passed to step S634.

In step S634, the packet processing unit 225 checks whether or not the destination ID and the source ID of the packet are described in the FCoE security DB 233. If the destination ID and the source ID of the packet are not described in the FCoE security DB 233, then the switch processing unit 221 discards the packet. In step S634, the packet processing unit 225 checks the FCoE security DB 233, thereby judging whether or not the connection between the source and the destination has been established. A communication is allowed between the ports where the connection has been established. The packet is discarded between the ports where the connection has not been established.

In the process above, security information is acquired by monitoring the PLOGI processing. Described next is the case in which security information is acquired from the Zone database of the FC switch.

Figure 14:
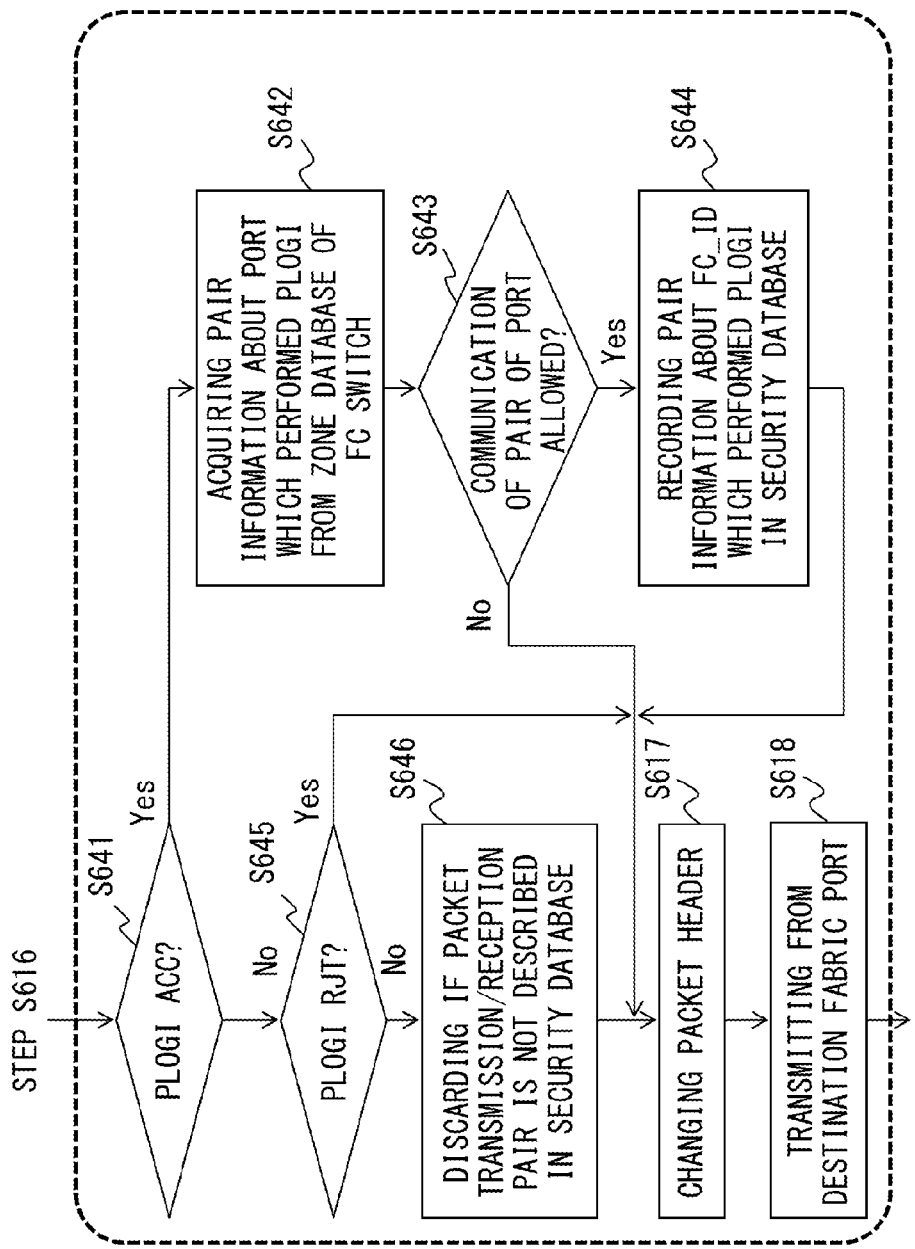
FIG. 14 is a flowchart of the second security check process according to the first embodiment.

FIG. 14 is a flowchart of the second security check process according to the first embodiment.

The second security check process in steps S641 through S646 in FIG. 14 is performed between steps S616 and S617 in the Fabric port reception process in FIG. 9.

In step S641, the switch processing unit 221 judges whether or not the packet is the PLOGI ACC. If the packet is the PLOGI ACC, control is passed to step S642. If the packet is not the PLOGI ACC, control is passed to step S645.

In step S642, the protocol processing unit 215 acquires the pair information about the ports which have performed the PLOGI from the Zone database of the FC switch 301. The Zone database describes the pair information about the ports for which a communication is permitted, and the worldwide name (WWN).

In step S643, the protocol processing unit 215 judges whether or not the pair of ports which have performed the PLOGI is permitted to perform a communication according to the information acquired from the Zone database. If a communication is permitted, control is passed to step S644. If a communication is not permitted, control is passed to step S617.

In step S644, the protocol processing unit 215 instructs the packet processing unit 225 to record the pair information of the FC IDs of the ports which have performed the PLOGI. The packet processing unit 225 records the pair information about the FC IDs of the ports which have performed the PLOGI in the FCoE security DB 233. Thus, the FCoE security DB 233 describes the pair information about the ports for which a communication is permitted and a connection has been established.

In step S645, the packet processing unit 225 judges whether or not the packet is the PLOGI RJD. If the packet is the PLOGI RJD, control is passed to step S617. If the packet is not the PLOGI RJD, control is passed to step S646.

In step S646, the packet processing unit 225 checks whether or not the destination ID and the source ID of the packet are described in the FCoE security DB 233. If the destination ID and the source ID of the packet are not described in the FCoE security DB 233, then the switch processing unit 221 discard the packet.

According to the Ethernet switch in the first embodiment, a packet may be directly transmitted to a destination device without the relay of the FC switch, thereby reducing the communication latency. Furthermore, the bottleneck of the communication between the Ethernet switch and the FC switch may be avoided.

Second Embodiment

Described next is the embodiment of using the FC switch instead of the Ethernet switch.

Figure 15:
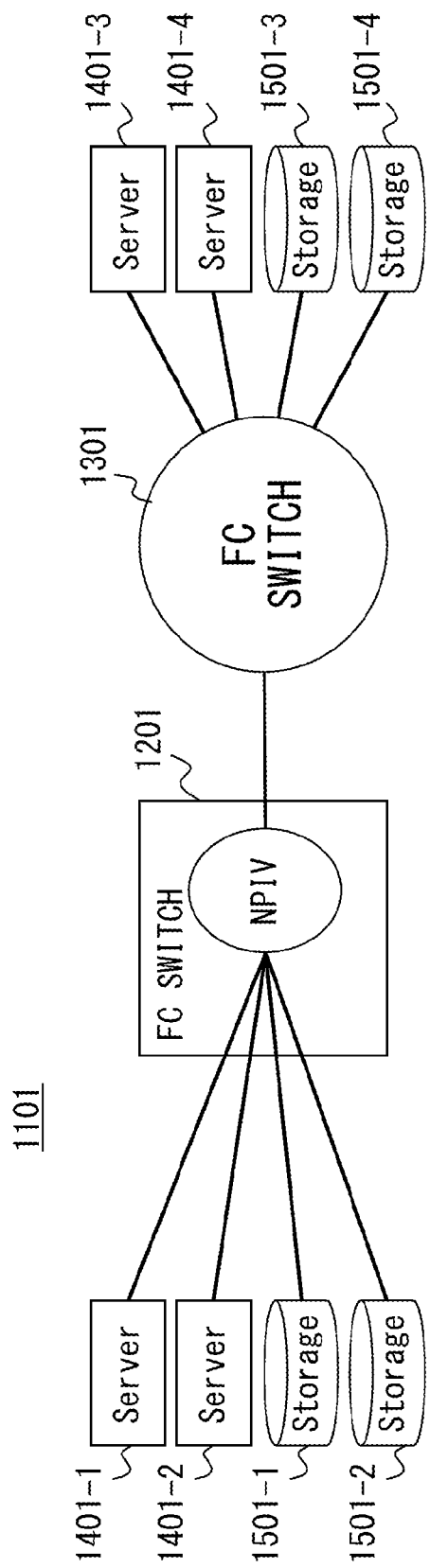
FIG. 15 illustrates a configuration of the system according to a second embodiment.

FIG. 15 illustrates a configuration of the system according to the second embodiment.

A system 1101 includes an FC switch 1201, an FC switch 1301, a server 1401-$i$ (i=1 to 4), and storage 1501-$i$.

The FC switch 1201 performs processes of routing and transforming a packet etc.

The FC switch 1201 has a gateway using the N_Port ID Virtualization (NPIV), and is connected to the FC switch 1301 using the NPIV.

The NPIV refers to the technology of virtualizing the ID of an N_Port to allow one physical port (N_Port) to have a plurality of port names and fabric addresses.

The FC switch 1201 presents the FC switch 1301 with a plurality of devices as if they were one device using the NPIV.

The FC switch 1201 is connected to the FC switch 1301, servers 1401-1 and 1401-2, and storage 1501-1 and 1501-2.

The FC switch 1201 is connected to the FC switch 1301, the servers 1401-1 and 1401-2, and the storage 1501-1 and 1501-2 through an optical fiber cable to communicate with the FC switch 1301, the servers 1401-1 and 1401-2, and the storage 1501-1 and 1501-2.

the FC switch 1301 is connected to the FC switch 1201, servers 1401-3 and 1401-4, and storage 1501-3 and 1501-4.

The FC switch 1301 is connected to the FC switch 1201, the servers 1401-3 and 1401-4, and the storage 1501-3 and 1501-4 through an optical fiber cable to communicate with the FC switch 1201, the servers 1401-3 and 1401-4, and the storage 1501-3 and 1501-4.

The FC switch 1301, the servers 1401-3 and 1401-4, and storage 1501-3 and 1501-4 configure an FC-SAN.

The server 1401 is an information processing device which performs various processes.

The servers 1401-1 and 1401-2 have an FC interface, and communicate with the FC switch 1201 using the FC. The servers 1401-1 and 1401-2 have ports for use in connecting to the FC switch 1201, and each port is assigned a unique Fibre Channel ID.

The servers 1401-3 and 1401-4 have functions similar to those of the servers 401-3 and 401-4. Therefore, the explanation of the functions is omitted here.

The storage 1501 is a device which stores data. The storage 1501 is, for example, a disk array device having a plurality of hard disk drives.

The storage 1501-1 and 1501-2 have an FC interface, and communicate with the FC switch 1201 using the FC. The servers 1501-1 and 1501-2 have ports for use in connecting to the FC switch 1201, and each port is assigned a unique Fibre Channel ID.

The storages 1501-3 and 1501-4 have functions similar to those of the storages 501-3 and 1501-4. Therefore, the explanation of the functions is omitted here.

Figure 16:
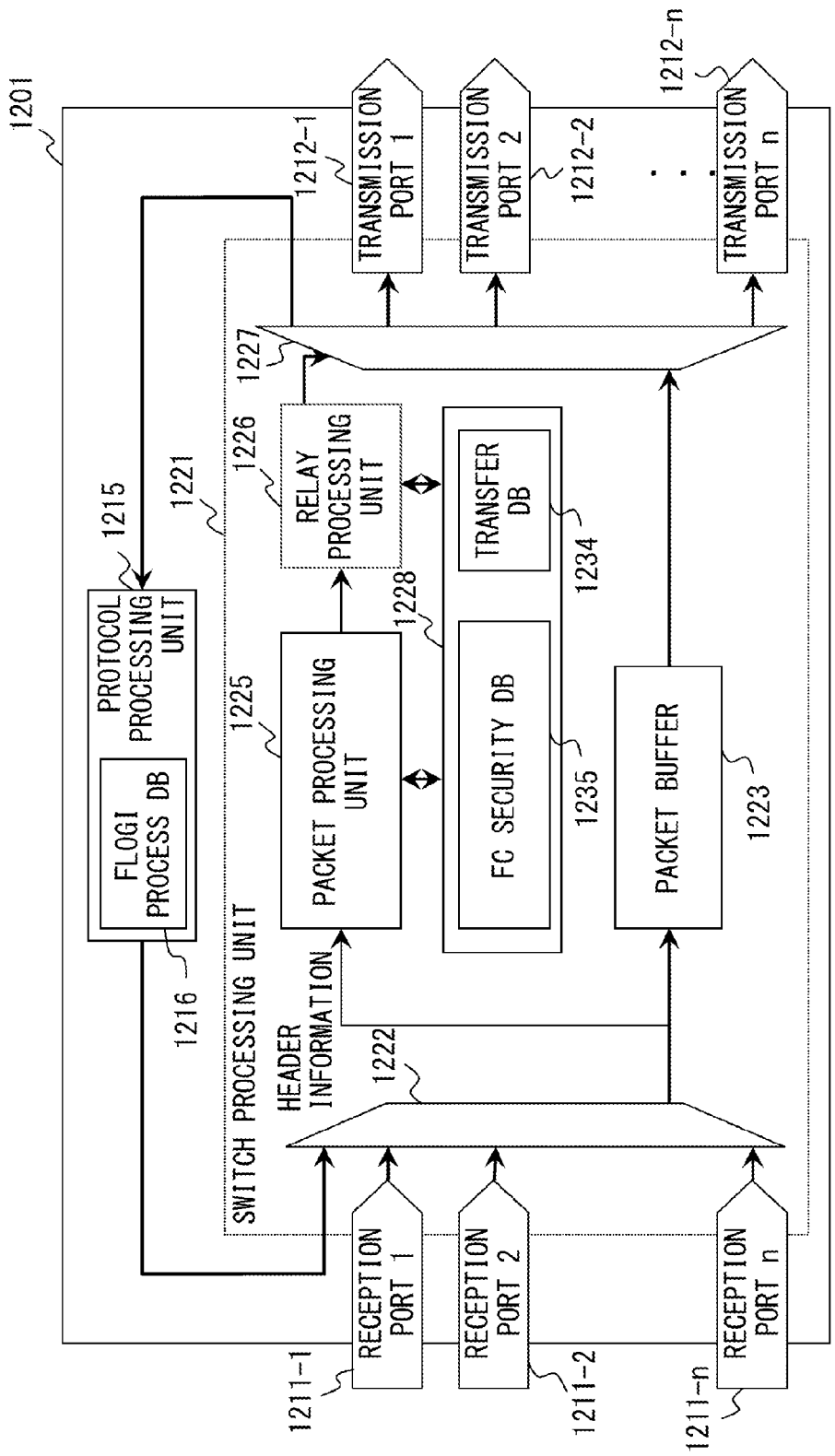
FIG. 16 illustrates a configuration of the FC switch according to the second embodiment.

FIG. 16 illustrates a configuration of the FC switch according to the second embodiment.

The FC switch 1201 includes a reception port 1211-$j$ (j=1~n (n is an integer)), a transmission port 1212-$j$, a protocol processing unit 1215, and a switch processing unit 1221.

The reception port 1211 is connected to the FC switch 1301, the servers 1401-1 and 1401-2, or the storage 1501-1 and 1501-2, and receives a packet.

The transmission port 1212 is connected to the FC switch 1301, the servers 1401-1 and 1401-2, or the storage 1501-1 and 1501-2, and transmits a packet.

The reception port 1211-$j$ and the transmission port 1212-$j$ configure a set of ports, and the reception port 1211-$j$ and the transmission port 1212-$j$ are assigned the same port numbers.

In the present embodiment, the reception port 1211 and the transmission port 1212 which is connected to the FC switch 1301 is called a Proxy port.

Similarly, the reception port 1211 and the transmission port 1212 which is connected to the servers 1401-1 and 1401-2 or the storage 1501-1 and 1501-2 is called a Fabric port.

The protocol processing unit 1215 performs processes of establishing a connection, monitoring a protocol, instructing the switch processing unit 1221, etc.

The protocol processing unit 1215 includes a FLOGI process database (DB) 1216.

The protocol processing unit 1215 is realized by, for example, the central processing unit (CPU) (not illustrated in the attached drawings) which reads and executes the software stored in the memory (not illustrated in the attached drawings) in the FC switch 1201. The protocol processing unit 1215 may also be realized by, for example, a hardware circuit, a processor, etc.

The FLOGI process DB 1216 is a record of the process of the FLOGI which is one of the protocols (FCoE initialization protocols) for establishment of a connection in the FCoE which is executed by the FC switch 1201.

FIG. 17 is an example of the FLOGI process DB.

The FLOGI process DB 216 includes items of a reception port, a transmission port, pre-transform packet header information, and post-transform packet header information. The reception port, the transmission port, the pre-transform packet header information, and the post-transform packet header information are associated with one another and stored in the FLOGI process DB 1216.

The reception port is an identifier indicating a port which has received a packet. The reception port describes, for example, a port number of the reception port 1211 which has received a packet.

The transmission port is an identifier indicating a port which has transmitted a packet. The transmission port describes, for example, a port number of the transmission port 1212 which has transmitted a packet.

The pre-transform packet header information is the information about a header of a packet before transform (FLOGI). The pre-transform packet header information includes an FC exchange ID.

The source MAC address is a MAC address of the device which has transmitted the packet of the FLOGI.

The post-transform packet header information is the information about a header of a packet after transform (FDISC). The post-transform packet header information includes an FC exchange ID.

The switch processing unit 1221 includes a multiplexer 1222, a packet buffer 1223, a packet processing unit 1225, a relay processing unit 1226, a demultiplexer 1227, and a storage unit 1228.

The switch processing unit 1221 is realized by, for example, a hardware circuit, a processor, etc.

The multiplexer 1222 outputs to the packet buffer 1223 a packet input from the protocol processing unit 1215 and the reception port 1211. From the packet output from the multiplexer 1222, the header information extraction unit (not illustrated in the attached drawings) extracts header information, and inputs the information to the packet processing unit 1225.

The packet buffer 1223 is a buffer which temporarily stores a received packet. The packet buffer 1223 outputs a stored packet to the demultiplexer 1227.

The packet processing unit 1225 determines the process of a packet based on the header information, a transfer DB 1234, and an FC security DB 1235. The packet processing unit 1225 performs a write and a read to and from the transfer DB 1234 and the FC security DB 1235.

The relay processing unit 1226 outputs to the demultiplexer 1227 a control signal indicating the destination of the output packet based on the transfer DB 1234.

The demultiplexer 1227 outputs a packet to the transmission port 1212 or the protocol processing unit 1215 according to the control signal from the relay processing unit 1226.

The storage unit 1228 is a device which stores data. The storage unit 1228 is, for example, RAM (random access memory). The storage unit 1228 stores the FC security DB 1235 and the transfer DB 1234.

The FC security DB 1235 is the information indicating a set of ports capable of performing a communication.

The transfer DB 1234 is the information indicating the connection between the port of the external device for connection to the FC switch 1201 and the port of the FC switch 1201.

Figure 18:
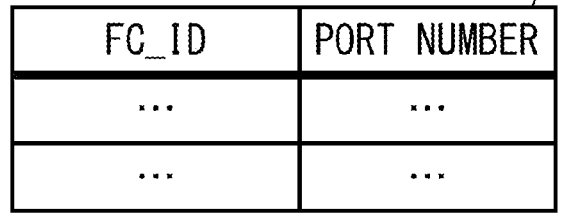
FIG. 18 is an example of a transfer DB.

FIG. 18 is an example of a transfer DB.

The transfer DB 1234 includes items of an FC ID and a port number. The transfer DB 1234 describes associated FC ID and port number.

The FC ID is and identifier assigned to the port of the device to which the FC switch 1201 is connected.

The port number indicates the transmission port 1212.

Figure 19:
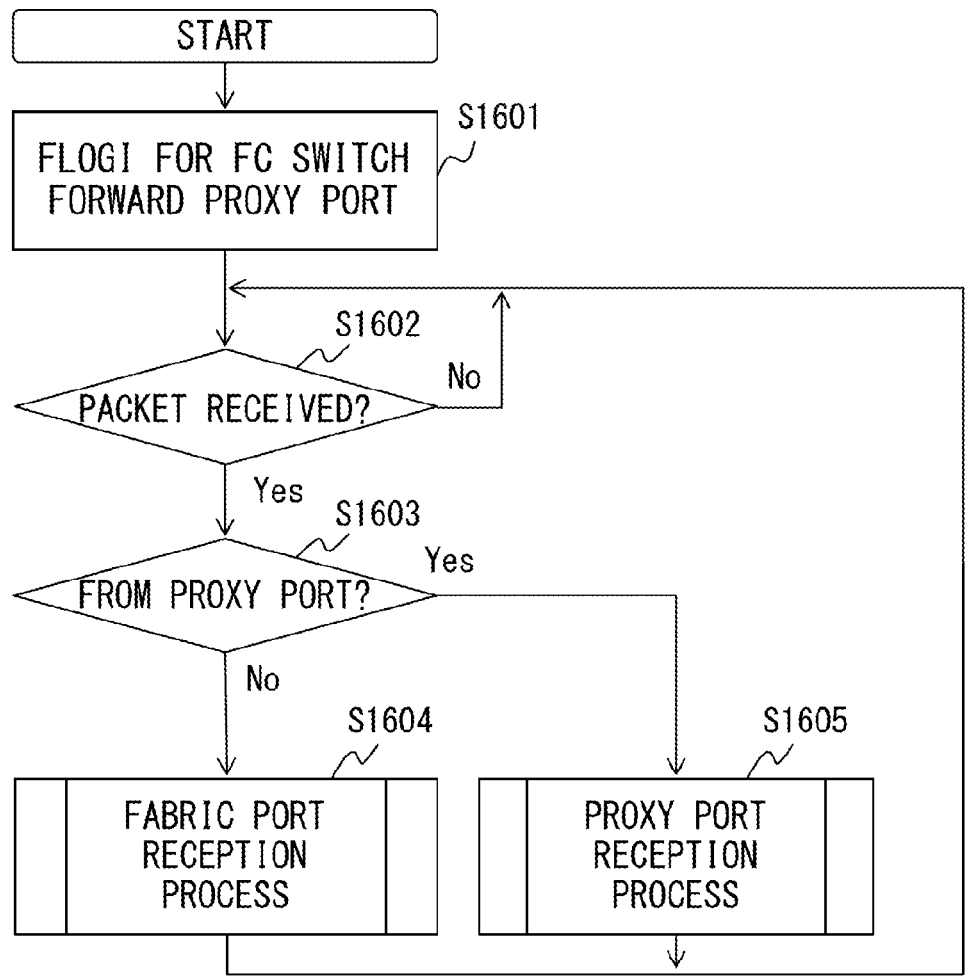
FIG. 19 is a flowchart of packet processing of the FC switch according to the second embodiment.

FIG. 19 is a flowchart of the packet process of an FC switch according to the second embodiment.

In step S1601, the protocol processing unit 1215 and the switch processing unit 1221 performs a fabric login (FLOGI) to the FC switch 1301.

In step S1602, the switch processing unit 1221 waits for the reception of a packet. When the switch processing unit 1221 receives a packet, control is passed to step S1603.

In step S1603, the protocol processing unit 1215 and the switch processing unit 1221 judge whether or not the received packet has been received by the Proxy port. If the received packet has been received by the Proxy port (that is, the packet has been received from the FC switch 1301), control is passed to step S1605. If the received packet has not been received by the Proxy port (that is, the packet has been received from the servers 1401-1 and 1401-2 of the storage 1501-1 and 1501-2), then control is passed to step S1604.

In step S1604, the FC switch 1201 performs the Fabric port reception process. The Fabric port reception process is described later in detail.

In step S1605, the FC switch 1201 performs the Proxy port reception process. The Proxy port reception process is described later in detail.

Figure 20:
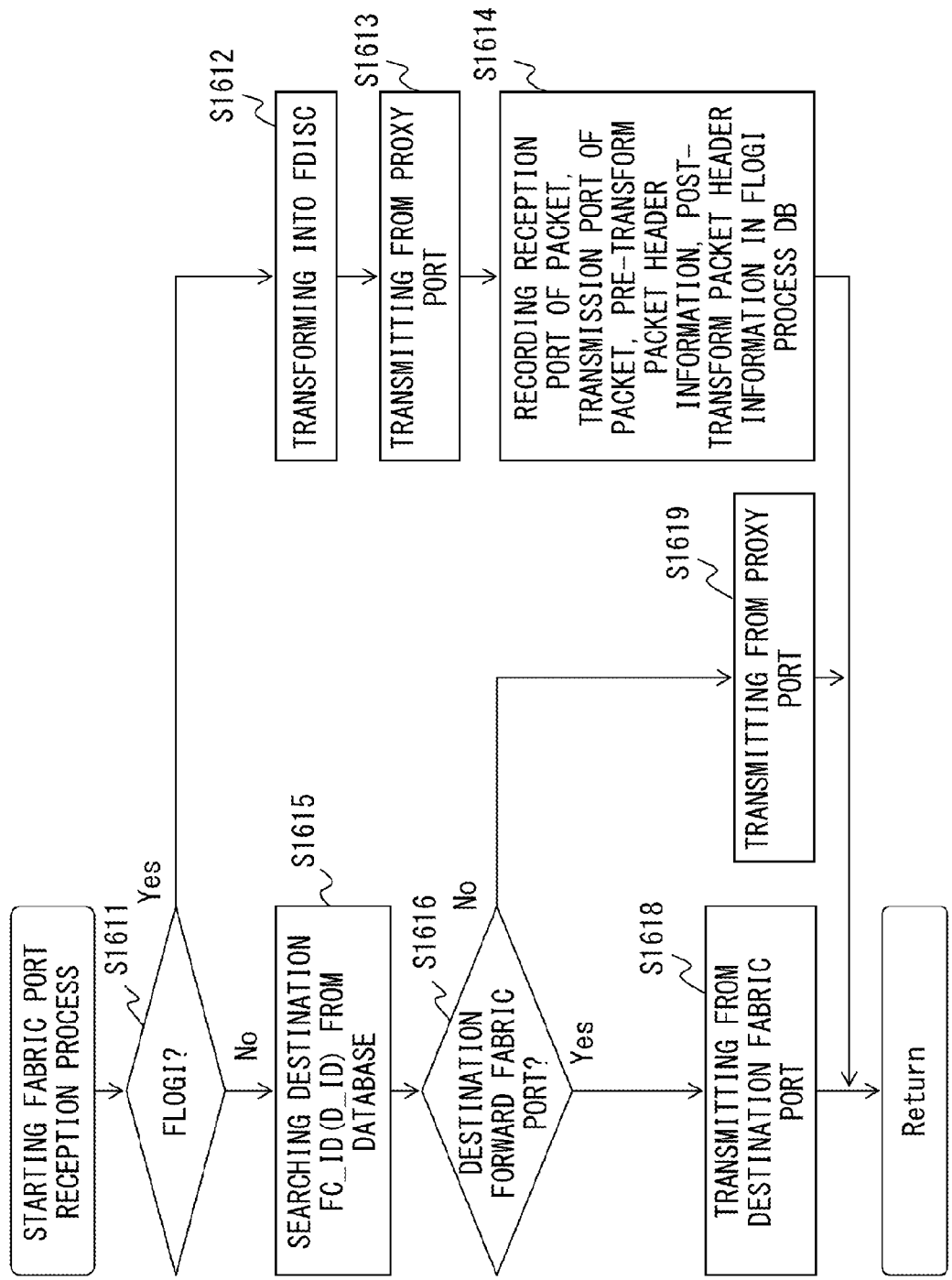
FIG. 20 is a detailed flowchart of the Fabric port reception process according to the second embodiment.

FIG. 20 is a detailed flowchart of the Fabric port reception process according to the second embodiment.

FIG. 20 corresponds to step S1604 in FIG. 19.

In step S1611, the switch processing unit 1221 judges whether or not the received packet is a packet of the FLOGI (FLOGI packet). If the packet is a FLOGI packet, control is passed to step S1612. If the packet is not a FLOGI packet, control is passed to step S1615.

In step S1612, the protocol processing unit 1215 transforms the FLOGI packet into a packet of the fabric discovery (FDISC) (FDISC packet).

In step S1613, the protocol processing unit 1215 outputs a FDISC packet from the transmission port 1212 (Proxy port) connected to the FC switch 1301 through the switch processing unit 1221.

In step S1614, the protocol processing unit 1215 records the port number of the reception port 1211 which has received the FLOGI packet in the reception port of the FLOGI process DB 1216, the port number of the transmission port 1212 which has transmitted the FDISC packet in the transmission port of the FLOGI process DB 1216, the header information about the FLOGI packet (FC exchange ID) in the pre-transform packet header information in the FLOGI process DB 1216, and the header information (FC exchange ID) about the FDISC packet in the post-transform packet header information in the FLOGI process DB 1216.

In step S1615, the packet processing unit 225 searches the transfer DB 1234 using the destination ID (D_ID) of the received packet as a search key.

In step S1616, the packet processing unit 1225 judges whether or not any Fabric port is connected to the port of the destination ID of the received packet. In detail, the packet processing unit 225 judges that there is a Fabric port connected to the port of the destination ID of the received packet when a record having the FC ID that matches the D_ID of the packet received from the transfer DB 1234 is detected. When any Fabric port is connected to the port of the destination ID of the received packet, control is passed to step S1618. When there is no Fabric port connected to the port of the destination ID of the received packet, control is passed to step S1619.

In step S1618, the relay processing unit 1226 transmits a packet from the Fabric port connected to the port of the destination ID. In detail, the relay processing unit 1226 transmits a packet from the transmission port 1212 indicated by the port number included in the record detected in step S1615.

In step S1619, the relay processing unit 1226 transmits a packet from the Proxy port in the transmission port 1212.

Described below is a concrete example of the path of a packet when the packet is transmitted between the FC devices connected through the FC switch 1201.

Figure 21:
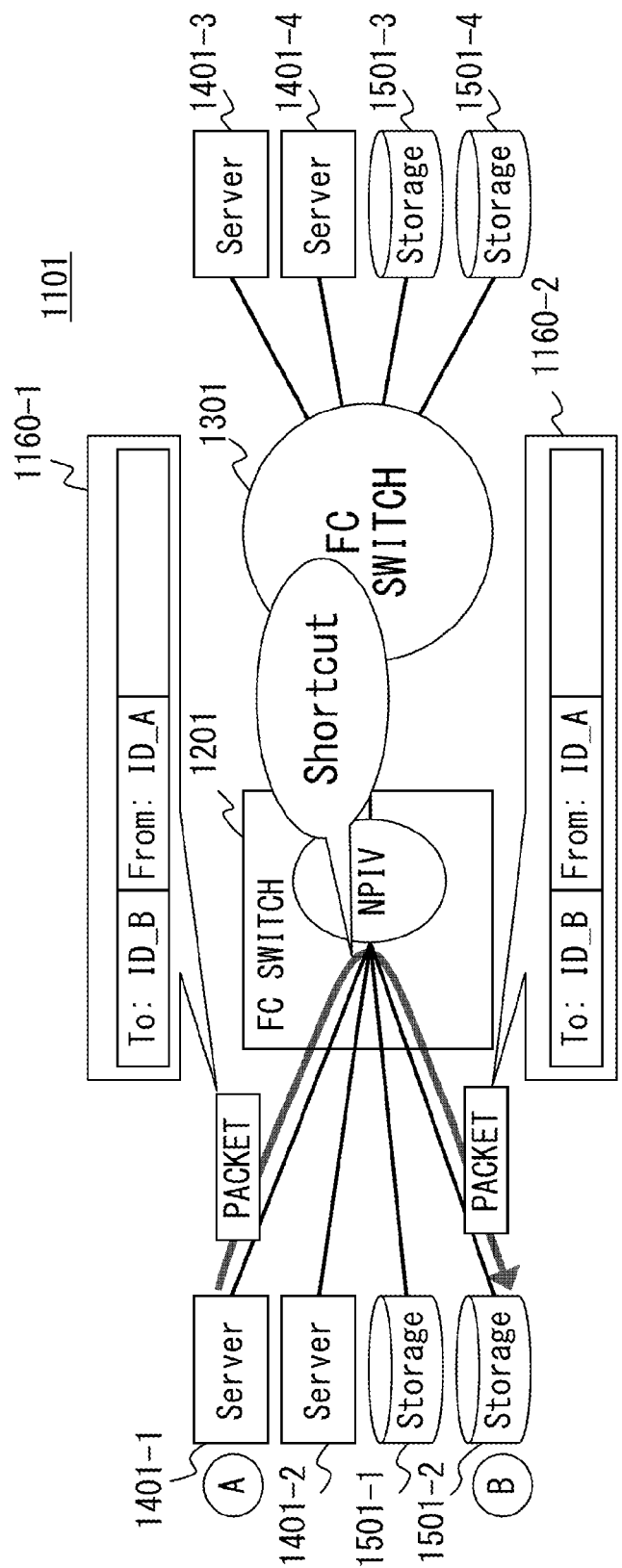
FIG. 21 illustrates a communication between FC devices according to the second embodiment.

FIG. 21 illustrates the communication between the FC devices according to the second embodiment.

FIG. 21 illustrates the case in which a packet is transmitted from the server 1401-1 to storage 1501-2.

Assume that FC ID of the server 1401-1 is ID_A, and the FC ID of the storage 1501-2 is ID_B.

The server 1401-1 transmits a packet 1160-1 addressed to the storage 1501-2 to the FC switch 1201.

The destination ID of the packet 1160-1 output from the server 1401-1 is ID_B, and the source ID is ID_A.

A destination check is made on the packet 1160-1 input to the FC switch 1201, and the storage 1501-2 is judged that it is connected to the Fabric port of the FC switch 1201.

The FC switch 1201 transmits a packet 1160-2 to the storage 1501-2. The contents of the packet 1160-1 are identical to the contents of the packet 1160-2. That is, the header of the packet 1160-2 has not been changed, and the destination ID is ID_B, and the source ID is ID_A like the packet 1160-1.

Thus, the packet output from the server 1401-1 reaches the storage 1501-2 without passing (shortcut) the FC switch 1301.

Figure 22:
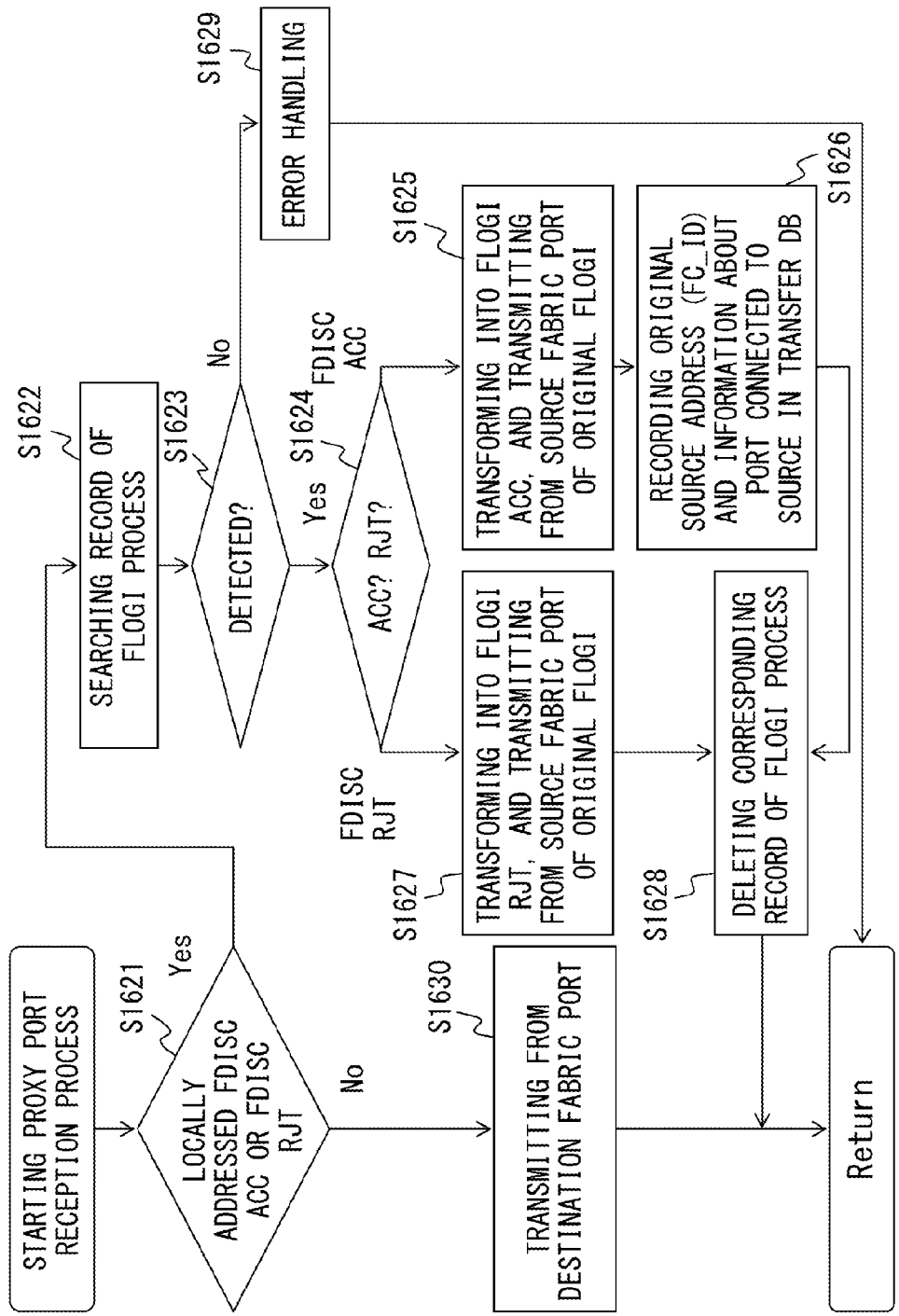
FIG. 22 is a detailed flowchart of the Proxy port reception process according to the second embodiment.

FIG. 22 is a detailed flowchart of the Proxy port reception process according to the second embodiment.

FIG. 22 corresponds to step S1605.

In step S1621, the switch processing unit 1221 judges whether the received packet is a FDISC ACC or a FDISC RJT addressed to the FC switch 1201. If the received packet is a FDISC ACC or a FDISC RJT addressed to the FC switch 1201, control is passed to step S1622. If the received packet is not the FDISC ACC or the FDISC RJT addressed to the FC switch 1201, control is passed to step S1630.

In step S1622, the protocol processing unit 1215 searches the FLOGI process DB 1216 using the FC exchange ID of the packet as a search key. In detail, the protocol processing unit 1215 checks whether or not the FC exchange ID of the packet matches the FC exchange ID described in the post-transform packet header information in the FLOGI process DB 1216. That is, if the received packet is the FDISC ACC (ACCEPT of FDISC) or the FDISC RJT (REJECT) addressed to the FC switch 1201, the packet is a reply to the packet transmitted after transform from the FLOGI to the FDISC. Therefore, the check is being made as to whether or not there is a record of a corresponding FLOGI process.

In step S1623, when the protocol processing unit 1215 detects the record of a corresponding FLOGI process (that is, when a record describing the FC exchange ID that matches the FC exchange ID of the packet is detected), control is passed to step S1624. If the record is not detected, control is passed to step S1629.

In step S1624, the protocol processing unit 1215 checks whether the packet is the FDISC ACC or the FDISC RJT. If the packet is the FDISC ACC, control is passed to step S1625. If the packet is the FDISC RJT, control is passed to step S1627.

In step S1625, the protocol processing unit 1215 transforms the FDISC ACC into the FLOGI ACC, and outputs the FLOGI ACC from the Fabric port connected to the source port of the FLOGI. The Fabric port connected to the source port of the FLOGI is the transmission port 1212 corresponding to the port number described in the reception port of the record detected from the FLOGI process DB 1216 in the search in step S1622.

In step S1626, the protocol processing unit 1215 instructs the packet processing unit 1225 to record the source address (FC ID) of the FLOGI and the information (port number) about the port connected to the source. The packet processing unit 1225 records in the transfer DB 1234 the source address (FC ID) of the FLOGI and the information (port number) about the port connected to the source.

In step S1627, the protocol processing unit 1215 transforms the FDISC RJT into the FLOGI RJT, and outputs the FLOGI RJT from the Fabric port connected to the source device of the FLOGI.

In step S1628, the protocol processing unit 1215 deletes the record corresponding to the FDISC ACC or the FDISC RJT (that is, the record detected in step S1622) from the FLOGI process DB 1216.

In step S1629, the protocol processing unit 1215 performs the error handling.

In step S1630, the switch processing unit 1221 outputs the packet from the Fabric port connected to the port of the destination ID.

According to the FC switch in the second embodiment, a packet may be directly transmitted to a destination device without the relay of the external FC switch, thereby reducing the communication latency. Furthermore, the bottleneck of the communication between the FC switches may be avoided.

All examples and conditional language provided herein are intended for pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An Ethernet switch which is connected to a plurality of external devices using an encapsulating I/O protocol over Ethernet, and is connected to an I/O protocol switch using N_Port ID virtualization, the Ethernet switch comprising:
   a first port which is connected to a first external device;
   a second port which is connected to a second external device;
   a third port which is connected to the I/O protocol switch;
   a storage unit which stores destination information describing an external device whose connection is established in the encapsulating I/O protocol over Ethernet in the plurality of external devices; and
   a processor, wherein:
   when the processor receives a packet, from the first port, that is addressed from the first external device to the second external device in the external devices and for which the I/O protocol switch has been set as a next destination device, the processor checks whether or not the destination information describes the second external device; and
   when the second external device is described in the destination information, the processor transmits the packet from the second port to the second external device.

2. The Ethernet switch according to claim 1, wherein when the processor transmits the packet to the second external device, the processor changes a destination media access control (MAC) address of the packet into a MAC address of the second external device, and changes a source MAC address of the packet into a MAC address of the I/O protocol switch.

3. The Ethernet switch according to claim 1, wherein the processor monitors a protocol which establishes a connection between the plurality of external devices in the encapsulating I/O protocol over Ethernet, and describes in the destination information an external device whose connection is established when the connection is established.

4. The Ethernet switch according to claim 1, wherein the processor describes in security information the first external device and the second external device when a port login is processed between the first external device and the second external device, and judges according to the security information whether or not the packet may be transmitted to the second external device.

5. The Ethernet switch according to claim 1, wherein:
   the I/O protocol switch includes a zone database describing whether or not a communication in a set of external devices is allowed;
   the processor
   acquires information about a set of the first external device and the second external device from the zone database of the I/O protocol switch when port login processing is performed between the first external device and the second external device;
   judges according to the acquired information as to whether or not a communication between the first external device and the second external device is allowed;
   describes in security information the set of the first external device and the second external device when the communication between the first external device and the second external device is allowed; and
   judges according to the security information whether or not the packet may be transmitted to the second external device.

6. A method of a communication performed by an Ethernet switch which is connected to a plurality of external devices using an encapsulating I/O protocol over Ethernet, and is connected to an I/O protocol switch using N_Port ID virtualization, and includes a first port which is connected to a first external device, a second port which is connected to a second external device, and a third port which is connected to the I/O protocol switch, the method comprising:
   referring to destination information which describes an external device whose connection in the encapsulating I/O protocol over Ethernet is established in the plurality of external devices when a packet is received, from the first port, that is addressed from the first external device to the second external device in the plurality of external devices and for which the I/O protocol switch has been set as a next destination device;
   checking whether or not the second external device is described in the destination information; and
   transmitting the packet from the second port to the second external device when the second external device is described in the destination information.

7. The method according to claim 6, wherein in transmitting the packet, destination media access control (MAC) address is changed into a MAC address of the second external device, and a source MAC address of the packet is changed into a MAC address of the I/O protocol switch.

8. The method according to claim 6, further comprising:
   monitoring a protocol which establishes a connection of the plurality of external devices in the encapsulating I/O protocol over Ethernet; and
   describing in the destination information an external device whose connection is established when the connection is established.

9. The method according to claim 6, further comprising:
   describing in security information the first external device and the second external device; and
   judging according to the security information whether or not the packet may be transmitted to the second external device
   in performing port login processing between the first external device and the second external device.

10. The method according to claim 6, wherein:
   the I/O protocol switch includes a zone database describing whether or not a communication in a set of external devices may be allowed; and
   the Ethernet switch
   acquires information about a set of the first external device and the second external device from the zone database of the I/O protocol switch when port login processing is performed between the first external device and the second external device;
   judges according to the acquired information as to whether or not a communication between the first external device and the second external device is allowed;
   describes in security information the set of the first external device and the second external device when the communication between the first external device and the second external device is allowed; and
   judges according to the security information whether or not the packet may be transmitted to the second external device.

* * * * *